US008407105B2

(12) United States Patent
Linden et al.

(10) Patent No.: US 8,407,105 B2
(45) Date of Patent: *Mar. 26, 2013

(54) DISCOVERY OF BEHAVIOR-BASED ITEM RELATIONSHIPS BASED ON BROWSING SESSION RECORDS

(75) Inventors: Gregory D. Linden, Seattle, WA (US); Brent R. Smith, Redmond, WA (US); Nida K. Zada, Seattle, WA (US)

(73) Assignee: Amazon.com, Inc., Seattle, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/154,334

(22) Filed: Jun. 6, 2011

(65) Prior Publication Data

US 2011/0238525 A1    Sep. 29, 2011

Related U.S. Application Data

(63) Continuation of application No. 11/009,732, filed on Dec. 10, 2004, now Pat. No. 7,970,664, which is a continuation of application No. 09/821,712, filed on Mar. 29, 2001, now Pat. No. 6,912,505, which is a continuation-in-part of application No. 09/156,237, filed on Sep. 18, 1998, now Pat. No. 6,317,722.

(51) Int. Cl.
   *G06Q 30/00*   (2012.01)
   *G06Q 10/00*   (2012.01)
(52) U.S. Cl. .................... 705/26.7; 705/7.29; 705/14.53; 705/14.73; 705/26.8; 705/27.1
(58) Field of Classification Search .................. 705/7.29, 705/14.53, 14.73, 26.7, 26.8, 27.1
See application file for complete search history.

(56) References Cited

U.S. PATENT DOCUMENTS

| | | | |
|---|---|---|---|
| 4,870,579 A | 9/1989 | Hey | |
| 4,996,642 A | 2/1991 | Hey | |
| 5,235,509 A | 8/1993 | Mueller et al. | |
| 5,446,891 A | 8/1995 | Kaplan et al. | |
| 5,459,306 A | 10/1995 | Stein et al. | |
| 5,583,763 A | 12/1996 | Atcheson et al. | |
| 5,615,341 A | 3/1997 | Agrawal et al. | |
| 5,724,567 A | 3/1998 | Rose et al. | |
| 5,734,885 A | 3/1998 | Agrawal et al. | |
| 5,745,681 A | 4/1998 | Levine et al. | |
| 5,749,081 A * | 5/1998 | Whiteis | 1/1 |
| 5,758,333 A | 5/1998 | Bauer et al. | |
| 5,774,670 A | 6/1998 | Montulli | |
| 5,774,868 A | 6/1998 | Cragun et al. | |
| 5,790,935 A | 8/1998 | Payton | |

(Continued)

FOREIGN PATENT DOCUMENTS

| | | |
|---|---|---|
| EP | 0 265083 A1 | 4/1988 |
| EP | 0 751 471 | 1/1997 |

(Continued)

OTHER PUBLICATIONS

Mobasher, B., Cooley, R., Srivastava, J. "Automatic personalization based on web usage mining," Aug. 2000. Communications of the ACM. vol. 43, No. 8, pp. 142-151.*

(Continued)

*Primary Examiner* — Scott Zare
(74) *Attorney, Agent, or Firm* — Knobbe, Martens, Olson & Bear LLP

(57) ABSTRACT

Various processes are disclosed for discovering item relationships between particular items, such as products represented in an electronic catalog, based on monitored user behaviors (e.g., item viewing activities, item purchases, shopping cart activities, etc.). The discovered item relationships may, for example, be used to generate personalized item recommendations for users, and/or to supplement item detail pages of an electronic catalog with lists of related items. Also disclosed are processes for generating personalized item recommendations based on users' search activities and browse node visits.

25 Claims, 14 Drawing Sheets

U.S. PATENT DOCUMENTS

| | | | |
|---|---|---|---|
| 5,794,209 | A | 8/1998 | Agrawal et al. |
| 5,794,210 | A | 8/1998 | Goldhaber et al. |
| 5,842,200 | A | 11/1998 | Agrawal et al. |
| 5,872,850 | A | 2/1999 | Klein et al. |
| 5,905,973 | A | 5/1999 | Yonezawa et al. |
| 5,909,492 | A | 6/1999 | Payne et al. |
| 5,920,855 | A | 7/1999 | Aggarwal et al. |
| 6,003,029 | A | 12/1999 | Agrawal et al. |
| 6,014,638 | A | 1/2000 | Burge et al. |
| 6,016,475 | A | 1/2000 | Miller et al. |
| 6,029,139 | A | 2/2000 | Cunningham et al. |
| 6,029,141 | A * | 2/2000 | Bezos et al. .................. 705/27.1 |
| 6,029,182 | A | 2/2000 | Nehab et al. |
| 6,029,195 | A | 2/2000 | Herz |
| 6,041,311 | A | 3/2000 | Chislenko et al. |
| 6,049,777 | A | 4/2000 | Sheena et al. |
| 6,055,513 | A | 4/2000 | Katz et al. |
| 6,064,980 | A | 5/2000 | Jacobi et al. |
| 6,078,740 | A | 6/2000 | DeTreville |
| 6,084,528 | A | 7/2000 | Beach et al. |
| 6,092,049 | A | 7/2000 | Chislenko et al. |
| 6,108,493 | A | 8/2000 | Miller et al. |
| 6,112,186 | A | 8/2000 | Bergh et al. |
| 6,144,964 | A | 11/2000 | Breese et al. |
| 6,202,058 | B1 | 3/2001 | Rose et al. |
| 6,230,153 | B1 | 5/2001 | Howard et al. |
| 6,233,682 | B1 | 5/2001 | Fritsch |
| 6,266,649 | B1 | 7/2001 | Linden et al. |
| 6,282,548 | B1 | 8/2001 | Burner et al. |
| 6,317,761 | B1 | 11/2001 | Landsman et al. |
| 6,321,221 | B1 | 11/2001 | Bieganski |
| 6,330,592 | B1 | 12/2001 | Makuch et al. |
| 6,334,127 | B1 | 12/2001 | Bieganski et al. |
| 6,356,879 | B2 * | 3/2002 | Aggarwal et al. .......... 705/26.62 |
| 6,438,579 | B1 | 8/2002 | Hosken |
| 6,466,970 | B1 | 10/2002 | Lee et al. |
| 6,484,149 | B1 | 11/2002 | Jammes et al. |
| 6,507,872 | B1 | 1/2003 | Geshwind |
| 6,587,127 | B1 | 7/2003 | Leeke et al. |
| 6,667,751 | B1 | 12/2003 | Wynn et al. |
| 6,691,163 | B1 | 2/2004 | Tufts |
| 6,782,370 | B1 * | 8/2004 | Stack ........................... 705/7.29 |
| 6,996,572 | B1 | 2/2006 | Chakrabarti et al. |
| 7,113,917 | B2 | 9/2006 | Jacobi et al. |
| 7,149,958 | B2 | 12/2006 | Landsman et al. |
| 7,155,401 | B1 | 12/2006 | Cragun et al. |
| 7,155,663 | B2 | 12/2006 | Landsman et al. |
| 2001/0013009 | A1 | 8/2001 | Greening et al. |
| 2001/0014868 | A1 | 8/2001 | Herz et al. |
| 2001/0021914 | A1 | 9/2001 | Jacobi et al. |
| 2001/0044758 | A1 | 11/2001 | Talib et al. |
| 2002/0031212 | A1 * | 3/2002 | O'Neil et al. ............ 379/211.02 |
| 2002/0082901 | A1 | 6/2002 | Dunning et al. |
| 2002/0116291 | A1 | 8/2002 | Grasso et al. |

FOREIGN PATENT DOCUMENTS

| | | |
|---|---|---|
| EP | 0 827 063 A1 | 3/1998 |
| GB | 2336925 A | 11/1999 |
| WO | 00/17792 A1 | 3/2000 |

OTHER PUBLICATIONS

R. Kohavi "Mining E-commerce Data: the Good the Bad and the Ugly," Proceedings of the Seventh ACM SIGKDD International Conference on Knowledge Discovery and Data Mining, pp. 8-13, ACM Press 2001 (of-record in parent application).

J. Andersen A. Giversen A. Jensen R. Larsen T. Pedersen and J. Skyt "Analyzing Clickstreams Using Subsessions," Proceedings of the Third ACM International Workshop on Data Warehousing and OLAP, pp. 25-32, ACM Press 2000 (of-record in parent application).

B. Mobasher R. Cooley and J. Srivastava "Automatic Personalization Based on Web Usage Mining," Communications of the ACM, vol. 43, Issue 8, ACM Press, pp. 142-151 (Aug. 2000) (of-record in parent application).

Upendra Shardanand and Pattie Maes with MIT Media-Lab, "Social Information Filtering: Algorithms for Automating Word of Mouth," 8 pages (undated) (of-record in parent application).

"Combining Social Networks and Collaborative Filtering," Communications of the ACM, vol. 40, No. 3 pp. 63-65, dated Mar. 1997 (of-record in parent application).

"Pointing the Way: Active Collaborative Filtering," CHI '95 Proceedings Papers, 1995,11 pages (of-record in parent application).

Bradley N. Miller, John T. Riedl, and Joseph A. Konstan, with Department of Computer Science University of Minnesota, "Experiences with Grouplens: Making Usenet Useful Again," Jun. 18, 1996, 13 pages (of-record in parent application).

"A System for Sharing Recommendations," Communications of the ACM, vol. 40, No. 3, pp. 59-62, dated Mar. 1997 (of-record in parent application).

"Recommender Systems for Evaluating Computer Messages," Communications of the ACM, vol. 40, No. 3, pp. 88-89, dated Mar. 1997 (of-record in parent application).

"Content-Based Collaborative Recommendation," Communications of the ACM, vol. 40, No. 3, pp. 66-72, dated Mar. 1997 (of-record in parent application).

"Applying Collaborative Filtering to Usenet News," Communications of the ACM, vol. 40, No. 3, pp. 77-87, dated Mar. 1997 (of-record in parent application).

"Personalized Navigation for the Web," Communications of the ACM, vol. 40, No. 3, pp. 73-76, dated Mar. 1997 (of-record in parent application).

"GroupLens: An Open Architecture for Collaborative Filtering of Netnews," 1994, 18 pages (of-record in parent application).

Christos Faloutsos and Douglas Oard with University of Maryland, "A Survey of Information Retrieval and Filtering Methods," 22 pages (undated) (of-record in parent application).

Joaquin Delgado, "Intelligent Collaborative Information Retrieval," 1998 (of-record in parent application).

Joaquin Delgado "Content-based Collaborative Information Filtering," 1998 (of-record in parent application).

Marko Balabanovic and Yoav Shoham, "Content-Based Collaborative Recommendation," Communications of the ACM vol. 40, No. 3, pp. 66-72, dated Mar. 1997 (of-record in parent application).

"COSMOCOM" Computer Telephoney, p. 124, dated Jul. 1998 (of-record in parent application).

Brier S.E., "Smart Devices Peep Into Your Grocery Cart," New York Times Co., Section G., p. 3, col. 3, Circuits, dated Jul. 1998 (of-record in parent application).

Nash E.L., "Direct Marketing; Strategy Planning Execution," 3rd Edition McGraw-Hill Inc., pp. 165 & 365-6, dated 1994 (of-record in parent application).

"iCatElectronic Commerce Suite Takes 'Best of show' Award at WebINNOVATION 97," PR Newswire, dated Jun. 1997 (of-record in parent application).

"iCat Corporation: iCat's Commerce Suite Makes Setting Up Shop on Net Even Easier Than High Street," M2 Presswire dated Feb. 1997 (of-record in parent application).

Dragon et al., "Advice From the Web," PC Magazine, vol. 16, No. 15, p. 133, dated Sep. 1997 (of-record in parent application).

"Able Solutions Announces Able Commerce 2.6," PR Newswire dated Sep. 1998 (of-record in parent application).

"Internet World—IBM to Expand E-Comm Features," Newsbytes News Network, dated Dec. 1996 (of-record in parent application).

McMains A., "Weiss Whitten Staliano's," ADWEEK Eastern Edition, vol. 39, No. 24, p. 82 ,dated Jun. 1998 (of-record in parent application).

"Cdnow Rated Top Music Site by eMarketer the Authority on Business Online," PR Newswire, dated Sep. 1998 (of-record in parent application).

Description in IDS dated Jun. 29 2001, in parent U.S. Appl. No. 09/821,712 of pre-critical-date activities of Amazon.com Inc. (of-record in parent application).

Agrawal R. Imielinski T. and Swami A., "Mining Association Rules between Sets of Items in Large Database," IBM Alamaden Research Center, SIGMOD, Washington, ACM 0-89791-592-5 (1993) (of-record in parent application).

Schafer et al., "E-Commerce Recommendation Applications," Data Mining and Knowledge Discovery, vol. 5, Nos. 1-2, Jan. 2001, pp. 115-153 (of-record in parent application).
"Leading Family E-Tailer FamilyWonder.com Makes Finding Best Gifts for Kids Even Easier," PR Newswire, New York: Nov. 30, 1999, p. 1 (of-record in parent application).
"Trellix Makes Web Site Promotion, Tracking and Digital Expression as Simple as Clip Art," Business/Technology Editors, Business Wire, New York: Feb. 3, 2000, p. 1 (of-record in parent application).
Answer and Counterclaims of Amazon.com, Inc., filed Dec. 14, 2006, in matter of *IBM* v. *Amazon.com, Inc.* (case 6:06-cv-452-LED) (of-record in parent application).
Plaintiff and counterclaim-defendant International Business Machines Corporation's Reply, Affirmative defenses and Counterclaims to Amazon.com's Counterclaims, dated Jan. 8, 2007, in matter of *IBM* v. *Amazon.com, Inc.* (case 6:06-cv-452-LED) (of-record in parent application).
Defendant and Counterclaim-Plaintiff Amazon.com, Inc.'s Reply to IBM's Affirmative Defenses and Counterclaims, dated Jan. 29, 2007, in matter of *IBM* v. *Amazon.com, Inc.* (case 6:06-cv-452-LED) (of-record in parent application).
International Business Machines Corporation's Patent Rule 3-3 Invalidity Contentions and Patent Rule 3-4 Document Production dated Apr. 27, 2007 ("IBM's Invalidity Contentions"), in matter of *IBM* v. *Amazon.com, Inc.* (case 6:06-cv-452) (of-record in parent application).
Appendices A1 and A2 of IBM's Invalidity Contentions dated Apr. 27, 2007, in matter of *IBM* v. *Amazon.com, Inc.* (case 6:06-cv-452) (of-record in parent application).
Appendices A3 and A4 of IBM's Invalidity Contentions dated Apr. 27, 2007, in matter of *IBM* v. *Amazon.com, Inc.* (case 6:06-cv-452) (of-record in parent application).
Appendices A5 and A6 of IBM's Invalidity Contentions dated Apr. 27, 2007, in matter of *IBM* v. *Amazon.com, Inc.* (case 6:06-cv-452) (of-record in parent application).
Appendices A7 and A8 of IBM's Invalidity Contentions dated Apr. 27, 2007, in matter of *IBM* v. *Amazon.com, Inc.* (case 6:06-cv-452) (of-record in parent application).
Appendices A9 and A10 of IBM's Invalidity Contentions dated Apr. 27, 2007, in matter of *IBM* v. *Amazon.com, Inc.* (case 6:06-cv-452) (of-record in parent application).
Appendices A11 and A12 of IBM's Invalidity Contentions dated Apr. 27, 2007, in matter of *IBM* v. *Amazon.com, Inc.* (case 6:06-cv-452) (of-record in parent application).
Appendices A13 and A14 of IBM's Invalidity Contentions dated Apr. 27, 2007, in matter of *IBM* v. *Amazon.com, Inc.* (case 6:06-cv-452) (of-record in parent application).
Appendices A15 and A16 of IBM's Invalidity Contentions dated Apr. 27, 2007, in matter of *IBM* v. *Amazon.com, Inc.* (case 6:06-cv-452) (of-record in parent application).
Appendix A17 of IBM's Invalidity Contentions dated Apr. 27, 2007, in matter of *IBM* v. *Amazon.com, Inc.* (case 6:06-cv-452) (of-record in parent application).
Appendix A18 of IBM's Invalidity Contentions dated Apr. 27, 2007, in matter of *IBM* v. *Amazon.com, Inc.* (case 6:06-cv-452) (of-record in parent application).
Appendix A19 of IBM's Invalidity Contentions dated Apr. 27, 2007, in matter of *IBM* v. *Amazon.com, Inc.* (case 6:06-cv-452) (of-record in parent application).
Appendix A20 of IBM's Invalidity Contentions dated Apr. 27, 2007, in matter of *IBM* v. *Amazon.com, Inc.* (case 6:06-cv-452) (of-record in parent application).
Appendix A21 of IBM's Invalidity Contentions dated Apr. 27, 2007, in matter of *IBM* v. *Amazon.com, Inc.* (case 6:06-cv-452) (of-record in parent application).
Appendix A22 of IBM's Invalidity Contentions dated Apr. 27, 2007, in matter of *IBM* v. *Amazon.com, Inc.* (case 6:06-cv-452) (of-record in parent application).
Appendix A23 of IBM's Invalidity Contentions dated Apr. 27, 2007, in matter of *IBM* v. *Amazon.com, Inc.* (case 6:06-cv-452) (of-record in parent application).
Appendix A24 of IBM's Invalidity Contentions dated Apr. 27, 2007, in matter of *IBM* v. *Amazon.com, Inc.* (case 6:06-cv-452) (of-record in parent application).
Appendix A25 of IBM's Invalidity Contentions dated Apr. 27, 2007, in matter of *IBM* v. *Amazon.com, Inc.* (case 6:06-cv-452) (of-record in parent application).
Appendix B of IBM's Invalidity Contentions dated Apr. 27, 2007, in matter of *IBM* v. *Amazon.com, Inc.* (case 6:06-cv-452) (of-record in parent application).
Agrawal, R., et al., "Mining Association Rules between Sets of Items in Large Databases," Proceedings of the 1993 ACM, SIGMOD International Conference on Management of Data, pp. 207-216, Washington D.C. (May 1993) (of-record in parent application).
Agrawal, R., et al., "Fast Algorithms for Mining Association Rules," Proceedings 20th International Conference on Very Large Databases, {VLDB}, pp. 487-499, Santiago, Chile, (Sep. 1994) (of-record in parent application).
Agrawal, R., et al., "Fast Algorithms for Mining Association Rules," IBM Research Report RJ9839, 31 pages, dated Nov. 16, 1994 (of-record in parent application).
Agrawal, R., et al., "Active Data Mining," IBM Alameden Research Center, Proceedings of the 1st International Conference on Knowledge Discovery in Databases and Data Mining, KDD-95, (1995) (of-record in parent application).
Agrawal, R., et al., "Mining Sequential Patterns," IBM Alamaden Research Center, Proceedings of the 11th International Conference on Data Engineering, Taipei, Taiwan, (Mar. 1995) (of-record in parent application).
Srikant, R., et al., "Mining Generalized Association Rules," IBM Almaden Research Center, Proceedings of the 21st International Conference on Very Large Databases, Zurich, Switzerland, (Sep. 1995) (of-record in parent application).
Srikant, R., et al., "Mining Sequential Patterns: Generalizations and Performance Improvements," Proceedings of the Fifth International Conference on Extending Database Technology (EDBT), Avignon, France, (1996) (of-record in parent application).
Agrawal, R., et al., "Parallel Mining of Association Rules," IEEE Transactions on Knowledge and Data Engineering, vol. 8, No. 6, (Dec. 1996) (of-record in parent application).
Agrawal, R., et al., "Developing Tightly-Coupled Data Mining Applications on a Relational Database System," IBM Alamaden Research Center, Proceedings of the Second International Conference on Knowledge Discovery and Data Mining, KDD-96 Proceedings, (1996) (of-record in parent application).
Agrawal, R., et al., "Parallel Mining of Association Rules: Design, implementation, and experience," IBM Research Division, Alamaden Research Center, IBM Research Report RJ10004, Computer Science/Mathematics, dated Feb. 1, 1996 (of-record in parent application).
Srikant, R., et al., "Mining Quantitative Association Rules in Large Relational Tables," IBM Alamaden Research Center, Proceedings of the ACM SIGMOD Conference on Management of Data, Montreal, Canada, (Jun. 1996) (of-record in parent application).
Agrawal, R., et al., "The Quest Data Mining System," Proceedings 1996 International Conference Data Mining and Knowledge Discovery (KDD'96), pp. 244-249, Portland, Oregon (Aug. 1996) (of-record in parent application).
Salton, G., et al., "Computer Evaluation of Indexing and Text Processing," The SMART Retrieval System: Experiments in Automatic Document Processing, Prentice-Hall, (1971) (of-record in parent application).
Order Construing Claims issued on Jan. 11, 2011, in case No. 2:09-cv-00681-RSL (13 pages) (of-record in parent application).
Complaint for Patent Infringement, dated May 15, 2009, in matter of *Amazon.com, Inc.* v. *Discovery Communications, Inc.* (case No. C09-0681 RSL) (of-record in parent application).
Defendant Discovery Communications, Inc.'s Answer to the Complaint, dated Jul. 23, 2009, in matter of *Amazon.com, Inc.* v. *Discovery Communications, Inc.* (case No. 2:09-cv-0681-RSL) (of-record in parent application).
Defendant Discovery Communications, Inc.'s Local Patent Rule 121 Invalidity Contentions, dated Nov. 16, 2009, In matter of *Amazon.*

*com, Inc.* v. *Discovery Communications, Inc.* (case No. 2:09-cv-0681-RSL) (of-record in parent application).

Defendant Discovery Communications, Inc.'s First Amended Answer, Defenses, & Counterclaims, dated Jan. 25, 2010, in matter of *Amazon.com, Inc.* v. *Discovery Communications, Inc.* (case No. 2:09-cv-0681-RSL) (of-record in parent application).

Plaintiff Amazon.com, Inc.'s Reply to Defendant Discovery Communications, Inc's First Amended Answer, Defenses and Counterclaims, dated Feb. 23, 2010, in matter of *Amazon.com, Inc.* v. *Discovery Communications, Inc.* (case No. 2:09-cv-0681-RSL) (of-record in parent application).

Joint Claim Construction and Prehearing Statement, dated Oct. 25, 2010, in matter of *Amazon.com, Inc.* v. *Discovery Communications, Inc.* (case No. 2:09-cv-0681-RSL) (of-record in parent application).

Joint Claim Chart (Exhibit A) dated Oct. 25, 2010, in matter of *Amazon.com, Inc.* v. *Discovery Communications, Inc.* (case No. 2:09-cv-0681-RSL) (of-record in parent application).

Plaintiff Amazon.com, Inc.'s Opening Claim Construction Brief Covering U.S. Patent Nos. 6,006,225; 6,169,986; 6,266,649 and 6,317,722, dated Nov. 11, 2010, in matter of *Amazon.com, Inc.* v. *Discovery Communications, Inc.* (case No. 2:09-cv-0681-RSL) (of-record in parent application).

Defendant Discovery Communications, Inc.'s Opening Claim Construction Brief, dated Nov. 11, 2010, in matter of *Amazon.com, Inc.* v. *Discovery Communications, Inc.* (case No. 2:09-cv-0681-RSL) (of-record in parent application).

Plaintiff Amazon.com, Inc.'s Responsive Claim Construction Brief Covering U.S. Patent Nos. 6,006,225; 6,169,986; 6,266,649 and 6,317,722, dated Dec. 2, 2010, in matter of *Amazon.com, Inc.* v. *Discovery Communications, Inc.* (case No. 2:09-cv-0681-RSL) (of-record in parent application).

Discovery Communications, Inc.'s Responsive Claim Construction Brief, dated Dec. 2, 2010, in matter of *Amazon.com, Inc.* v. *Discovery Communications, Inc.* (case No. 2:09-cv-0681-RSL) (of-record in parent application).

Exhibit D-1: Invalidity Chart for the Linden '649 Patent Based on Gustos Publication and Product ("Gustos"), dated Nov. 16, 2009, in matter of *Amazon.com, Inc.* v. *Discovery Communications, Inc.* (case No. 2:09-cv-0681-RSL) (of-record in parent application).

Exhibit D-2: Invalidity Chart for the Linden '649 Patent Based on Amazon.com Website ("Amazon.com"), dated Nov. 16, 2009, in matter of *Amazon.com, Inc.* v. *Discovery Communications, Inc.* (case No. 2:09-cv-0681-RSL) (of-record in parent application).

Exhibit D-3: Invalidity Chart for the Linden '649 Patent Based on U.S. Patent No. 6,782,370 to Stack ("Amazon.com"), Nov. 16, 2009, in matter of *Amazon.com, Inc.* v. *Discovery Communications, Inc.* (case No. 2:09-cv-0681-RSL) (of-record in parent application).

Exhibit D-4: Invalidity Chart for the Linden '649 Patent Based on U.S. Patent No. 6,334,127 to Bieganski (filed Jul. 17, 1998, and Issued Dec. 25, 2001) ("Bieganski '127"), in matter of *Amazon.com, Inc.* v. *Discovery Communications, Inc.* (case No. 2:09-cv-0681-RSL) (of-record in parent application).

Exhibit D-5: Invalidity Chart for the Linden '649 Patent Based on U.S. Patent No. 5,749,081 to Whiteis (filed Apr. 6, 1998, and Issued May 5, 1998) ("Whiteis '081"), in matter of *Amazon.com, Inc.* v. *Discovery Communications, Inc.* (case No. 2:09-cv-0681-RSL) (of-record in parent application).

Exhibit D-6: Invalidity Chart for the Linden '649 Patent Based on U.S. Patent No. 5,583,763 to Atcheson (filed Sep. 9, 1993, and Issued Dec. 10, 1996) ("Atcheson '763"), in matter of *Amazon.com, Inc.* v. *Discovery Communications, Inc.* (case No. 2:09-cv-0681-RSL) (of-record in parent application).

Exhibit E-1: Invalidity Chart for Jacobi '722 Patent Based on Gustos Publication and Product ("Gustos"), dated Nov. 16, 2009, in matter of *Amazon.com, Inc.* v. *Discovery Communications, Inc.* (case No. 2:09-cv-0681-RSL) (of-record in parent application).

Exhibit E-2: Invalidity Chart for Jacobi '722 Patent Based on Amazon.com Website, dated Nov. 16, 2009, in matter of *Amazon.com, Inc.* v. *Discovery Communications, Inc.* (case No. 2:09-cv-0681-RSL) (of-record in parent application).

Exhibit E-3: Invalidity Chart for Jacobi '722 Patent Based on U.S. Patent No. 6,782,370 to Stack (Filed Sep. 4, 1997, and Issued Aug. 24, 2004) ("Stack '370"), in matter of *Amazon.com, Inc.* v. *Discovery Communications, Inc.* (case No. 2:09-cv-0681-RSL) (of-record in parent application).

Exhibit E-4: Invalidity Chart for Jacobi '722 Patent Based on U.S. Patent No. 6,334,127, to Bieganski (Filed Jul. 17, 1998, and Issued Dec. 25, 2001) ("Bieganski '127"), in matter of *Amazon.com, Inc.* v. *Discovery Communications, Inc.* (case No. 2:09-cv-0681-RSL) (of-record in parent application).

Exhibit E-5: Invalidity Chart for Jacobi '722 Patent Based on U.S. Patent No. 5,749,081 to Whiteis (Filed Apr. 6, 1995, and Issued May 5, 1998) ("Whiteis '081"), in matter of *Amazon.com, Inc.* v. *Discovery Communications, Inc.* (case No. 2:09-cv-0681-RSL) (of-record in parent application).

Exhibit E-6: Invalidity Chart for Jacobi '722 Patent Based on U.S. Patent No. 5,583,763 to Atcheson (Filed Sep. 9, 1993, and Issued Dec. 10, 1996) ("Atcheson '763"), in matter of *Amazon.com, Inc.* v. *Discovery Communications, Inc.* (case No. 2:09-cv-0681-RSL) (of-record in parent application).

Exhibit F-1: titled "Other Prior Art that Discloses or Renders Obvious Limitation of Amazon's '649 and '722 Patents," dated Nov. 16, 2009, in matter of *Amazon.com, Inc.* v. *Discovery Communications, Inc.* (case No. 2:09-cv-0681-RSL) (of-record in parent application).

Joshua Alspector et al., "Feature-based and Clique-based User Models for Movie Selection: A Comparative Study," in User Modeling and User-Adapted Interaction 7, pp. 279-304, dated 1997 (of-record in parent application).

"Internet Shopping Threatens Retailers," Reuters, DowJones, p. 1 of 2 (2009) Factiva, Inc. (of-record in parent application).

Al Borchers, et al., "Ganging up on Information Overload," University of Minnesota, Internet Watch, pp. 106-108, (Apr. 1998) (of-record in parent application).

Tim Dorgan, "Belief in the Future," Progressive Grocer; Feb. 1997; vol. 76, No. 2; ABI/INFORM Global, pp. 67-68 (of-record in parent application).

Greg Elofson, et al., "Creating a Custom Mass-Production Channel on the Internet," Communications of the ACM, Mar. 1998, vol. 41, No. 3, pp. 57-62 (of-record in parent application).

Greg Enright, "Collaborative Filtering Weeds out Irrelevant Data," in Information World Canada, Sep. 1997, vol. 22, No. 9; ABI/INFORM Global, p. 11 (of-record in parent application).

"Firefly Technology: Tools for Cultivating Profitable Customer Relationships," printed from http://web.archive.org/web/19970116111618/www.firefly.net/technology.htm, Jan. 16, 1997 (of-record in parent application).

D. Fisk, "An Application of Social Filtering to Movie Recommendation," Software Agents and Soft Computing Towards Enhancing Machine Intelligence, Data Mining Group, BT Laboratories, Lecture Notes in Computer Science, ISSN: 0302-9743 (print), vol. 1198/1997, pp. 116-131, printed on Oct. 29, 2009 from springerlink.com/.../ek4665q6h51072w (of-record in parent application).

Natalie Glance, et al., "Knowledge Pump: Community-centered Collaborative Filtering," Xerox Research Centre Europe, Grenoble Laboratory, pp. 1-5, Oct. 27, 1997 (of-record in parent application).

Gustos, "Why You Should Use Gustos?" printed from http://web.archive.org/web/19980131020417/www.gustos.com/applications.html, Jan. 31, 1998 (of-record in parent application).

Justin Hibbard, "Just Add People," Information Week, vol. 662, ABI/INFORM Global, p. 65, Dec. 22, 1997 (of-record in parent application).

Paul N. Hodgdon, "The Role of Intelligent Agent Software in the Future of Direct Response," Direct Response, Direct Marketing, pp. 10-17, Jan. 1997 (of-record in parent application).

Marguerite Holloway, "Wired," printed from http://wired.com/wired/archive/5.12/maes_pr.html, pp. 1-7, dated Nov. 4, 2009 (of-record in parent application).

Thorsten Joachims, et al., "WebWatcher: A Tour Guide for the World Wide Web," in 6 pages (undated) (of-record in parent application).

Bruce Krulwich, "Lifestyle Finder, Intelligent User Profiling Using Large-Scale Demographic Data," AI Magazine, American Association for Artificial Intelligence, pp. 37-45, Summer 1997 (of-record in parent application).

Len Lewis, "Short Circuits," One-click shopping, Progressive Grocer, vol. 76, No. 7, ABI/INFORMAL Global, p. 80, Jul. 1997 (of-record in parent application).

Paul McJones, et al., "SRC Technical Note," Each to Each Programmer's Reference Manual, Digital Equipment Corporation, p. 1-16, dated Oct. 1, 1997 (of-record in parent application).

David M. Nichols, et al., "Recommendation and Usage in the Digital Library," Lancaster University Computing Department, Cooperative Systems Engineering Group, pp. 1-15, (1997) (of-record in parent application).

Catherine Applefeld Olson, "Merchants & Marketing," Software Aims to Personalize Net Retailing, Billboard, Research Library, vol. 110, No. 13, 2 pages, dated Mar. 28, 1998 (of-record in parent application).

Rose, Daniel E., et al., "MessageWorld: A New Approach to Facilitating Asynchronous Group Communication," CIKM '95, ACM 0-89791-812-6, pp. 266-273, (1995) (of-record in parent application).

Curt Stevens, "Automating the Creation of Information Filters," Communications of the ACM, vol. 35, No. 12, Dec. 1992 (of-record in parent application).

Loren G. Terveen, et al., "Building Task-Specific Interfaces to High Volume Conversational Data," Papers, CHI 97, Atlanta, GA, ACM 0-89791-802-9/97/03, pp. 226-233, Mar. 22-27, 1997 (of-record in parent application).

"Tvisions Delivers Harvard Business School Publishing Onto World Wide Web," PR Newswire, dated Jul. 16, 1996 (of-record in parent application).

"The WEBDOGGIE Personalized Document Filtering System," 3 pages printed from http://web.archive.org/web/19961213005420/http://webhound.www.media.mit.edu/projects/webhound/doc/webhound.html, Dec. 13, 1996 (of-record in parent application).

Stephen H. Wildstrom, "Service with a Click," Business Week, Technology & You, No. 3519, p. 19, dated Mar. 24, 1997 (of-record in parent application).

Decision issued by EPO on Dec. 13, 2010, in European Appl. No. 99 951 441.7 (of-record in parent application).

Yezdezard Zerxes Lashkari, "Feature Guided Automated Collaborative Filtering," B. Tech, Computer Science and Engineering, Indian Institute of Technology, Bombay (May 1991) (of-record in parent application).

"IBM announces data mining solution for improved decision making; new ammo for knowledge discovery and validation of business intelligence," Business Wire, pp. 1-4, dated Apr. 9, 1996 (of-record in parent application).

Gifford, David K., et al., "Payment Switches for Open Networks," Proceedings of the First USENIX Workshop on Electronic Commerce, New York, New York, pp. 1-8 (Jul. 1995) (of-record in parent application).

Karlgren, Jussi, "Newsgroup Clustering Based on User Behavior—A Recommendation Algebra," SICS Technical Report, T94:04, ISSN 1100-3154 (of-record in parent application).

Lieberman, Henry, "Letizia: An Agent That Assists Web Browsing," Media Laboratory, Massachusetts Institute of Technology, pp. 1-6 (undated) (of-record in parent application).

Mobasher, Bamshad, et al., "Automatic Personalization Based on Web Usage Mining," printed from http://maya.cs.depaul.edu/~mobasher/personalization/index.html (1 de 24) [Oct. 27, 2003 18:24:00], pp. 1-24 (of-record in parent application).

Mobasher, Bamshad, et al., "Creating Adaptive Web Sites Through Usage-Based Clustering of URLs," pp. 1-7 (undated) (of-record in parent application).

Cooley, R., et al., "Web Mining: Information and Pattern Discovery on the World Wide Web," Department of Computer Science and Engineering, University of Minnesota, pp. 1-10 (undated) (of-record in parent application).

Cooley, R., et al., "Data Preparation for Mining World Wide Web Browsing Patterns," Department of Computer Science and Engineering, University of Minnesota, pp. 1-26 (undated) (of-record in parent application).

Mobasher, Bamshad, et al., "Web Mining: Pattern Discovery from World Wide Web Transactions," Department of Computer Science and Engineering, University of Minnesota, pp. 1-12, dated Mar. 8, 1997 (of-record in parent application).

Wu, K. L, et al., "SpeedTracer: A Web usage mining and analysis tool," IBM Systems, Journal, vol. 37, No. 1, pp. 1-17, (1998) (of-record in parent application).

Shardanand, Upendra, "Social Information Filtering for Music Recommendations," Submitted to the Department of Electrical Engineering and Computer Science on Sep. 1, 1994, in partial fulfillment of the requirements for the degrees of Bachelor of Science in Electrical Science and Engineering and Master of Engineering in Electrical Engineering and Computer Science, Massachusetts Institute of Technology, stamped Nov. 18, 1994 (Libraries Archives) (of-record in parent application).

"Feedforward neutral network," Wikipedia, downloaded Jan. 28, 2011 (of-record in parent application).

Apte, C., "Data Mining—An Industrial Research Perspective," IEEE Computational Science and Engineering, Apr.-Jun. 1997 (of-record in parent application).

* cited by examiner

CLICK STREAM TABLE

| SESSION ID | DETAIL PAGE LIST | BROWSE NODE LIST | SEARCH QUERY LIST |
|---|---|---|---|
| 1234567 | dp1, dp2, dp3, dp4 | bn1, bn2, bn3, bn4 | "a space odyssey", "isaac asimov" |
|  |  |  |  |
|  |  |  |  |

FIG. 9

PAGE-ITEM TABLE

| PAGE IDENTIFICATION | ITEM IDENTIFICATION | |
|---|---|---|
| DP1 | "2001: A Space Odyssey" | |
| BN1 | "Sony DVP-S360 DVD Player", "Toshiba SD-1600 DVD player," ... | |

*FIG. 10* amazon.com

VIEW CART | WISH LIST | YOUR ACCOUNT | HELP

TODAY'S FEATURED STORES

WELCOME | DIRECTORY

BOOKS | TOYS & GAMES | SOFTWARE | ELECTRONICS | TOOLS & HARDWARE

▶ INTERNATIONAL ▶ TOP SELLERS ▶ FRIENDS & FAVORITES ▶ FREE E-CARDS ▶ TAX CENTER

SEARCH: [All Products ▼] [_____] (GO)    BROWSE: [BOOKS · ▼] (GO)

THE PAGE YOU MADE
BY YOU, FOR YOU, IN REAL TIME!

Welcome, Bob Smith, to the Page You Made!   (If you're not Bob Smith, click here.)
The Page You Made is based on your recent clicks on our site. Our goal is to help you find what you want and discover related items. You can change this page by visiting more product pages or removing items from the list of recently viewed items. Learn more

My Recently Viewed Items (402)

- ☑ *Moo, Baa, LA LA LA (Boyton, Sandra. Boynton Board Books.)* by Sandra Boynton (Illustrator), Kate Klimo (Editor)
  •
  •
  •
- ☐ *The Going to Bed Book (Boynton, Sandra. Boynton Board Books.)* by Sandra Boynton, Kate Kilmo (editor)

(Update page) (De-Select all items)

Top Sellers (406)

Children's Books > Baby-3 > Board Books

1. Dr. Seuss's ABC : An Amazing Book (Bright and Early Board Book) by Seuss
Our Price: $3.99  You Save: $1.00 (20%)

2. There's a Wocket in My Pocket! : Dr. Seuss's Book of Ridiculous Rhymes by Seuss, et al
Our Price: $3.99  You Save: $1.00 (20%)

3. Goodnight Moon by Margret Wise Brown, Clement Hurd (Illustrator)
Our Price: $6.36  You Save: $1.59 (20%)

Recommendations (404)

- Brown Bear, Brown Bear, What Do You See? From Horn Book
- Good Night Gorilla by Sandra Boynton
  •
  •
  •
- Baby Bach Video From Baby Einstein Company

*FIG. 11*

DISCOVERY OF BEHAVIOR-BASED ITEM RELATIONSHIPS BASED ON BROWSING SESSION RECORDS

RELATED APPLICATIONS

This application is a continuation of U.S. application Ser. No. 11/009,732, filed Dec. 10, 2004 now U.S. Pat. No. 7,970, 664, which is a continuation of U.S. application Ser. No. 09/821,712, filed Mar. 29, 2001 (now U.S. Pat. No. 6,912, 505), which is a continuation-in-part of U.S. application Ser. No. 09/156,237, filed Sep. 18, 1998 (now U.S. Pat. No. 6,317, 722).

FIELD OF THE INVENTION

The present invention relates to methods for monitoring activities of online users, and for recommending items to users based on such activities.

BACKGROUND OF THE INVENTION

A recommendation service is a computer-implemented service that recommends items from a database of items. The recommendations are customized to particular users based on information known about the users. One common application for recommendation services involves recommending products to online customers. For example, online merchants commonly provide services for recommending products (books, compact discs, videos, etc.) to customers based on profiles that have been developed for such customers. Recommendation services are also common for recommending Web sites, articles, and other types of informational content to users.

One technique commonly used by recommendation services is known as content-based filtering. Pure content-based systems operate by attempting to identify items which, based on an analysis of item content, are similar to items that are known to be of interest to the user. For example, a content-based Web site recommendation service may operate by parsing the user's favorite Web pages to generate a profile of commonly-occurring terms, and then use this profile to search for other Web pages that include some or all of these terms.

Content-based systems have several significant limitations. For example, content-based methods generally do not provide any mechanism for evaluating the quality or popularity of an item. In addition, content-based methods generally require that the items include some form of content that is amenable to feature extraction algorithms; as a result, content-based systems tend to be poorly suited for recommending products and other types of items that have little or no useful, parsable content.

Another common recommendation technique is known as collaborative filtering. In a pure collaborative system, items are recommended to users based on the interests of a community of users, without any analysis of item content. Collaborative systems commonly operate by having the users explicitly rate individual items from a list of popular items. Some systems, such as those described in instead require users to create lists of their favorite items. See U.S. Pat. Nos. 5,583,763 and 5,749,081. Through this explicit rating or list creating process, each user builds a personal profile of his or her preferences. To generate recommendations for a particular user, the user's profile is compared to the profiles of other users to identify one or more "similar users." Items that were rated highly by these similar users, but which have not yet been rated by the user, are then recommended to the user. An important benefit of collaborative filtering is that it overcomes the above-noted deficiencies of content-based filtering.

As with content-based filtering methods, however, existing collaborative filtering techniques have several problems. One problem is that users of online stores frequently do not take the time to explicitly rate the products, or create lists of their favorite products. As a result, the online merchant may be able to provide personalized product recommendations to only a small segment of its customers.

Further, even if a user takes the time to set up a profile, the recommendations thereafter provided to the user typically will not take into account the user's short term shopping or browsing interests. For example, the recommendations may not be helpful to a user who is purchasing a gift for another user, or who is venturing into an unfamiliar product category.

Another problem with collaborative filtering techniques is that an item in the database normally cannot be recommended until the item has been rated. As a result, the operator of a new collaborative recommendation system is commonly faced with a "cold start" problem in which the service cannot be brought online in a useful form until a threshold quantity of ratings data has been collected. In addition, even after the service has been brought online, it may take months or years before a significant quantity of the database items can be recommended. Further, as new items are added to the catalog (such as descriptions of newly released products), these new items may not recommendable by the system for a period of time.

Another problem with collaborative filtering methods is that the task of comparing user profiles tends to be time consuming, particularly if the number of users is large (e.g., tens or hundreds of thousands). As a result, a tradeoff tends to exist between response time and breadth of analysis. For example, in a recommendation system that generates real-time recommendations in response to requests from users, it may not be feasible to compare the user's ratings profile to those of all other users. A relatively shallow analysis of the available data (leading to poor recommendations) may therefore be performed.

Another problem with both collaborative and content-based systems is that they generally do not reflect the current preferences of the community of users. In the context of a system that recommends products to customers, for example, there is typically no mechanism for favoring items that are currently "hot sellers." In addition, existing systems typically do not provide a mechanism for recognizing that the user may be searching for a particular type or category of item.

SUMMARY

These and other problems are addressed by providing computer-implemented methods for automatically identifying items that are related to one another based on the activities of a community of users. Item relationships are determined by analyzing user purchase histories, product viewing histories, shopping cart activities, and/or other types of historical browsing data reflecting users' interests in particular items. This process may be repeated periodically (e.g., once per day or once per week) to incorporate the latest browsing activities of users. The resulting item relatedness data may be used to provide personalized item recommendations to users (e.g., product recommendations to customers of an online store), and/or to provide users with non-personalized lists of related items (e.g., lists of related products on product detail pages).

The present disclosure also provides methods for recommending items to users without requiring the users to explicitly rate items or create lists of their favorite items. The personal recommendations are preferably generated using item relatedness data determined using the above-mentioned methods, but may be generated using other sources or types of item relatedness data (e.g., item relationships determined using a content-based analysis). In one embodiment (described below), the personal recommendations are based on the products or other items viewed by the customer during a current browsing session, and thus tend to be highly relevant to the user's current shopping or browsing purpose.

One aspect of the disclosure thus involves methods for identifying items that are related to one another. In a preferred embodiment, user actions that evidence users' interests in, or affinities for, particular items are recorded for subsequent analysis. These item-affinity-evidencing actions may include, for example, the purchase of an item, the viewing of an item's detail page, and/or the addition of an item to an online shopping cart. To identify items that are related or "similar" to one another, an off-line table generation component analyzes the histories of item-affinity-evidencing actions of users (preferably on a periodic basis) to identify correlations between items for which such actions were performed. For example, in one embodiment, user-specific purchase histories are analyzed to identify correlations between item purchases (e.g., products A and B are similar because a significant number of those who bought A also bought B).

In one embodiment, product viewing histories of users are recorded and analyzed to identify items that tend to be viewed in combination (e.g., products A and B are similar because a significant number of those who viewed A also viewed B during the same browsing session). This may be accomplished, for example, by maintaining user-specific (and preferably session-specific) histories of item detail pages viewed by the users. An important benefit to using product viewing histories is that relationships can be determined between items for which little or no purchase history data exists (e.g., an obscure product or a newly-released product). Another benefit to using viewing histories is that the item relationships identified include relationships between items that are pure substitutes for each other. This is in contrast to purely purchase based relationships, which are typically exclusively between items that are complements of one another (tend to be bought in combination).

The results of the above process are preferably stored in a table that maps items to sets of similar items. For instance, for each reference item, the table may store a list of the N items deemed most closely related to the reference item. The table also preferably stores, for each pair of items, a value indicating the predicted degree of relatedness between the two items. The table is preferably generated periodically using a most recent set of purchase history data, product viewing history data, and/or other types of historical browsing data reflecting users' item interests.

Another aspect of the disclosure involves methods for using predetermined item relatedness data to provide personalized recommendations to users. To generate recommendations for a user, multiple items "known" to be of interest to the user are initially identified (e.g., items currently in the user's shopping cart). For each item of known interest, a pre-generated table that maps items to sets of related items (preferably generated as described above) is accessed to identify a corresponding set of related items. Related items are then selected from the multiple sets of related items to recommend to the user. The process by which a related item is selected to recommend preferably takes into account both (a) whether that item is included in more than one of the related items sets (i.e., is related to more than one of the "items of known interest"), and (2) the degree of relatedness between the item and each such item of known interest. Because the personalized recommendations are generated using preexisting item-to-item similarity mappings, they can be generated rapidly (e.g., in real time) and efficiently without sacrificing breadth of analysis.

Three specific implementations are disclosed of a service that generates recommendations as set forth above. All three service implementations may be embodied within the same Web site or other online system, and may use the same or a similar table that maps items to sets of similar items. In one implementation of the service, the personal recommendations are generated based on the items currently in the user's shopping cart, and are displayed on the shopping cart page. In a second implementation, the recommendations are based on items purchased and/or rated by the user.

In a third implementation, the recommendations are generated by monitoring the products viewed by the user during the current browsing session, and using these as the "items of known interest." The resulting list of recommended items (products) is presented to the user during the same browsing session. In one embodiment, these session-specific recommendations are displayed on a customized page. From this page, the user can individually de-select the viewed items used as the "items of known interest," and then initiate generation of a refined list of recommended items. Because the recommendations are based on the items viewed during the current session, they tend to be closely tailored to the user's current browsing or shopping interests. Further, because the recommendations are based on items viewed during the session, recommendations may be provided to a user who is unknown or unrecognized (e.g., a new visitor), even if the user has never placed an item in a shopping cart.

Also disclosed is a method of supplementing product detail pages within an online catalog of products. The method comprising processing product viewing histories of a plurality of users (preferably as set forth above) to identify, for each first product, a set of additional products that are deemed related to the first product. The set of additional products is incorporated into a product detail page of the first product to assist users in locating related products during browsing of the online catalog. The detail pages for some or all of the products in the catalog may be supplemented in this manner.

Also disclosed is a feature for displaying a hypertextual list of recently viewed products or other items to the user. For example, in one embodiment, the user can view a list of the products/product detail pages viewed during the current browsing session, and can use this list to navigate back to such detail pages. The list may optionally be filtered based on the category of products currently being viewed by the user. For example, when a user views a product detail page of an item, the detail page may be supplemented with a list of other recently viewed items falling within the same product category as the viewed product.

The present disclosure also provides a method for recommending items to a user based on the browse nodes recently visited by the user (e.g., those visited during the current session). In one embodiment, the method comprises selecting items to recommend to the user, taking into consideration whether each item is a member of one or more of the recently visited browse nodes. An item that is a member of more than one recently visited browse node may be selected over items that are members of only a single recently visited browse node.

Further, the present disclosure provides a method for recommending items to a user based on the searches recently conducted by the user (e.g., those conducted during the current session). In one embodiment, the method comprises selecting items to recommend to the user based on whether each item is a member of one or more of the results sets of the recently conducted searches. An item that is a member of more than one such search results set may be selected over items that are members of only a single search results set.

Thus, a variety of inventive computer-implemented methods are disclosed for assisting users in locating items of interest in an electronic catalog. One such method comprises maintaining, in computer storage during a browsing session of a user, a record of a plurality of catalog items selected by the user for viewing during the browsing session ("accessed items"); and programmatically selecting during the browsing session at least one additional item to present to the user, taking into consideration item viewing activities of prior users who have selected an accessed item for viewing during browsing of the electronic catalog. Another such method involves maintaining, in computer storage during a browsing session of a user, a record of a plurality of catalog items selected by the user for viewing during the browsing session ("accessed items"); and programmatically selecting during the browsing session at least one additional item to present to the user, taking into consideration statistical data reflective of a likelihood that a user who selects an accessed item for viewing will also select the additional item for viewing.

Another such method for assisting users in locating items in an electronic catalog comprises recording, in a session record of a browsing session of a user, identifiers of a plurality of catalog items selected by the user for viewing in the electronic catalog ("accessed items"); programmatically selecting a plurality of additional items to recommend to the user based, at least in part, on the plurality of accessed items recorded in said session record; and during the browsing session: (a) outputting to the user a list of the accessed items and a list of the additional items, (b) detecting de-selection by the user of one or more of the accessed items, and (c) generating, and outputting to the user, a refined list of additional items which reflects said de-selection. Yet another such method comprises recording a plurality of search queries submitted by a user during a browsing session of the electronic catalog; programmatically selecting a set of items to recommend to the user, such that a decision whether to include a candidate item in said set of items to recommend takes into consideration whether the candidate item is responsive to more than one of said plurality of search queries; and outputting a representation of said set of items to the user during said browsing session.

BRIEF DESCRIPTION OF THE DRAWINGS

These and other features of the disclosure will now be described with reference to the drawings summarized below. These drawings and the associated description are provided to illustrate specific embodiments, and not to limit the scope of the invention.

FIG. 9 illustrates the general form of the click stream table in FIG. 8.

FIG. 10 illustrates the general form of a page-item table.

FIG. 11 illustrates one embodiment of a personalized Web page used to display session-specific recommendations to a user in the system of FIG. 8.

DETAILED DESCRIPTION OF SPECIFIC EMBODIMENTS

Figure 1:
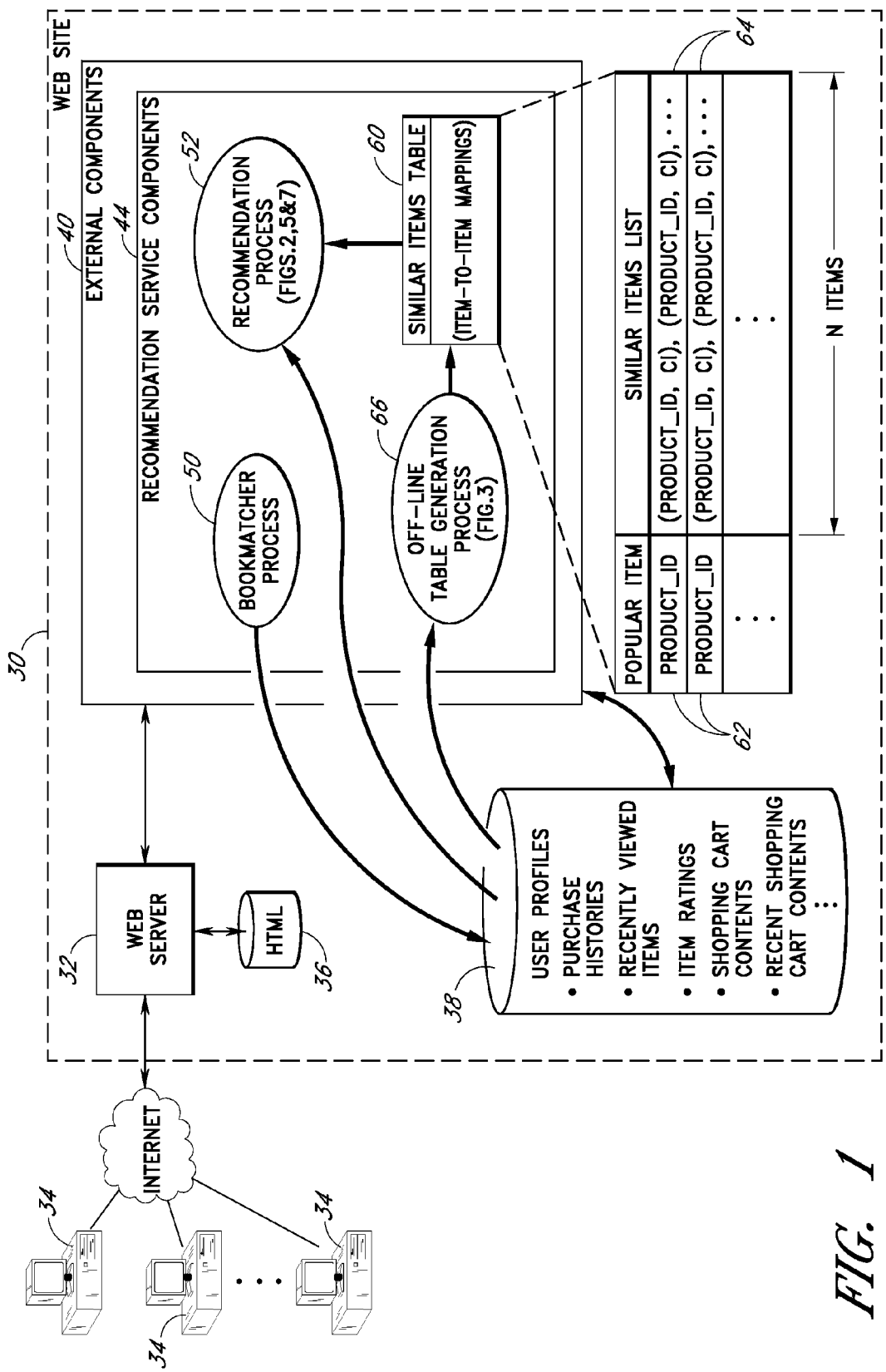
FIG. 1 illustrates a Web site which implements a recommendation service which embodies various inventive features, and illustrates the flow of information between components.

The various features and methods will now be described in the context of a recommendation service, including specific implementations thereof, used to recommend products to users from an online catalog of products. Other features for assisting users in locating products of interest will also be described.

Throughout the description, the term "product" will be used to refer generally to both (a) something that may be purchased, and (b) its record or description within a database (e.g., a Sony Walkman and its description within a products database.) A more specific meaning may be implied by context. The more general term "item" will be used in the same manner. Although the items in the various embodiments described below are products, it will be recognized that the disclosed methods are also applicable to other types of items, such as authors, musical artists, restaurants, chat rooms, other users, and Web sites.

Throughout the description, reference will be made to various implementation-specific details, including details of implementations on the Amazon.com Web site. These details are provided in order to fully illustrate preferred embodiments of the inventive subject matter, and not to limit the scope of the protection. The scope of the invention is set forth in the appended claims.

As will be recognized, the various methods set forth herein may be embodied within a wide range of different types of multi-user computer systems, including systems in which information is conveyed to users by synthesized voice or on wireless devices. Further, as described in section X below, the recommendation methods may be used to recommend items to users within a physical store (e.g., upon checking out). Thus, it should be understood that the HTML Web site based implementations described herein illustrate just one type of system in which the inventive methods may be used.

I. Overview of Web Site and Recommendation Services

To facilitate an understanding of the specific embodiments described below, an overview will initially be provided of an example merchant Web site in which the various inventive features may be embodied.

As is common in the field of electronic commerce, the merchant Web site includes functionality for allowing users to search, browse, and make purchases from an online catalog of purchasable items or "products," such as book titles, music titles, video titles, toys, and electronics products. The various product offerings are arranged within a browse tree in which each node represents a category or subcategory of product. Browse nodes at the same level of the tree need not be mutually exclusive.

Detailed information about each product can be obtained by accessing that product's detail page. (As used herein, a "detail page" is a page that predominantly contains information about a particular product or other item.) In a preferred embodiment, each product detail page typically includes a description, picture, and price of the product, customer reviews of the product, lists of related products, and information about the product's availability. The site is preferably arranged such that, in order to access the detail page of a product, a user ordinarily must either select a link associated with that product (e.g., from a browse node page or search results page) or submit a search query uniquely identifying the product. Thus, access by a user to a product's detail page generally represents an affirmative request by the user for information about that product.

Using a shopping cart feature of the site, users can add and remove items to/from a personal shopping cart which is persistent over multiple sessions. (As used herein, a "shopping cart" is a data structure and associated code which keeps track of items that have been selected by a user for possible purchase.) For example, a user can modify the contents of the shopping cart over a period of time, such as one week, and then proceed to a check out area of the site to purchase the shopping cart contents.

The user can also create multiple shopping carts within a single account. For example, a user can set up separate shopping carts for work and home, or can set up separate shopping carts for each member of the user's family. A preferred shopping cart scheme for allowing users to set up and use multiple shopping carts is disclosed in U.S. application Ser. No. 09/104,942, filed Jun. 25, 1998, titled METHOD AND SYSTEM FOR ELECTRONIC COMMERCE USING MULTIPLE ROLES, the disclosure of which is hereby incorporated by reference.

The Web site also implements a variety of different recommendation services for recommending products to users. One such service, known as BookMatcher™, allows users to interactively rate individual books on a scale of 1-5 to create personal item ratings profiles, and applies collaborative filtering techniques to these profiles to generate personal recommendations. The BookMatcher service is described in detail in U.S. Pat. No. 6,064,980, the disclosure of which is hereby incorporated by reference. The site may also include associated services that allow users to rate other types of items, such as CDs and videos. As described below, the ratings data collected by the BookMatcher service and/or similar services is optionally incorporated into the recommendation processes of the present invention.

Another type of service is a recommendation service which operates in accordance with the invention. In one embodiment the service ("Recommendation Service") used to recommend book titles, music titles, video titles, toys, electronics products, and other types of products to users. The Recommendation Service could also be used in the context of the same Web site to recommend other types of items, including authors, artists, and groups or categories of products. Briefly, given a unary listing of items that are "known" to be of interest to a user (e.g., a list of items purchased, rated, and/or viewed by the user), the Recommendation Service generates a list of additional items ("recommendations") that are predicted to be of interest to the user. (As used herein, the term "interest" refers generally to a user's liking of or affinity for an item; the term "known" is used to distinguish items for which the user has implicitly or explicitly indicated some level of interest from items predicted by the Recommendation Service to be of interest.)

The recommendations are generated using a table which maps items to lists of related or "similar" items ("similar items lists"), without the need for users to rate any items (although ratings data may optionally be used). For example, if there are three items that are known to be of interest to a particular user (such as three items the user recently purchased), the service may retrieve the similar items lists for these three items from the table, and appropriately combine these lists (as described below) to generate the recommendations.

In accordance with one aspect of the invention, the mappings of items to similar items ("item-to-item mappings") are generated periodically, such as once per week, from data which reflects the collective interests of the community of users. More specifically, the item-to-item mappings are generated by an off-line process which identifies correlations between known interests of users in particular items. For example, in one embodiment described in detail below, the mappings are generating by analyzing user purchase histories to identify correlations between purchases of particular items (e.g., items A and B are similar because a relatively large portion of the users that purchased item A also bought item B). In another embodiment (described in section IV-B below), the mappings are generated using histories of the items viewed by individual users (e.g., items A and B are related because a significant portion of those who viewed item A also viewed item B). Item relatedness may also be determined based in-whole or in-part on other types of browsing activities of users (e.g., items A and B are related because a significant portion of those who put item A in their shopping carts also put item B in their shopping carts). Further, the item-to-item mappings could reflect other types of similarities, including content-based similarities extracted by analyzing item descriptions or content.

An important aspect of the Recommendation Service is that the relatively computation-intensive task of correlating item interests is performed off-line, and the results of this task (item-to-item mappings) are stored in a mapping structure for subsequent look-up. This enables the personal recommendations to be generated rapidly and efficiently (such as in real-time in response to a request by the user), without sacrificing breadth of analysis.

In accordance with another aspect of the invention, the similar items lists read from the table are appropriately weighted (prior to being combined) based on indicia of the user's affinity for or current interest in the corresponding items of known interest. For example, in one embodiment described below, if the item of known interest was previously rated by the user (such as through use of the BookMatcher service), the rating is used to weight the corresponding similar items list. Similarly, the similar items list for a book that was purchased in the last week may be weighted more heavily than the similar items list for a book that was purchased four months ago.

Another feature of the invention involves using the current and/or recent contents of the user's shopping cart as inputs to the Recommendation Service. For example, if the user currently has three items in his or her shopping cart, these three items can be treated as the items of known interest for purposes of generating recommendations, in which case the recommendations may be generated and displayed automatically when the user views the shopping cart contents. If the user has multiple shopping carts, the recommendations are preferably generated based on the contents of the shopping cart implicitly or explicitly designated by the user, such as the shopping cart currently being viewed. This method of generating recommendations can also be used within other types of recommendation systems, including content-based systems and systems that do not use item-to-item mappings.

Using the current and/or recent shopping cart contents as inputs tends to produce recommendations that are highly correlated to the current short-term interests of the user—even if these short term interests are not reflected by the user's purchase history. For example, if the user is currently searching for a father's day gift and has selected several books for prospective purchase, this method will have a tendency to identify other books that are well suited for the gift recipient.

Another feature of the invention involves generating recommendations that are specific to a particular shopping cart. This allows a user who has created multiple shopping carts to conveniently obtain recommendations that are specific to the role or purpose to the particular cart. For example, a user who has created a personal shopping cart for buying books for her children can designate this shopping cart to obtain recommendations of children's books. In one embodiment of this feature, the recommendations are generated based solely upon the current contents of the shopping cart selected for display. In another embodiment, the user may designate one or more shopping carts to be used to generate the recommendations, and the service then uses the items that were purchased from these shopping carts as the items of known interest.

As will be recognized by those skilled in the art, the above-described techniques for using shopping cart contents to generate recommendations can also be incorporated into other types of recommendation systems, including pure content-based systems.

Another feature, which is described in section V-C below, involves displaying session-specific personal recommendations that are based on the particular items viewed by the user during the current browsing session. For example, once the user has viewed products A, B and C, these three products may be used as the "items of known interest" for purposes of generating the session-specific recommendations. The recommendations are preferably displayed on a special Web page that can selectively be viewed by the user. From this Web page, the user can individually de-select the viewed items to cause the system to refine the list of recommended items. The session recommendations may also or alternatively be incorporated into any other type of page, such as the home page or a shopping cart page.

FIG. 1 illustrates the basic components of the Web site 30, including the components used to implement the Recommendation Service. The arrows in FIG. 1 show the general flow of information that is used by the Recommendation Service. As illustrated by FIG. 1, the Web site 30 includes a Web server application 32 ("Web server") which processes HTTP (Hypertext Transfer Protocol) requests received over the Internet from user computers 34. The Web server 32 accesses a database 36 of HTML (Hypertext Markup Language) content which includes product detail pages and other browsable information about the various products of the catalog. The "items" that are the subject of the Recommendation Service are the titles (preferably regardless of media format such as hardcover or paperback) and other products that are represented within this database 36.

The Web site 30 also includes a "user profiles" database 38 which stores account-specific information about users of the site. Because a group of individuals can share an account, a given "user" from the perspective of the Web site may include multiple actual users. As illustrated by FIG. 1, the data stored for each user may include one or more of the following types of information (among other things) that can be used to generate recommendations in accordance with the invention: (a) the user's purchase history, including dates of purchase, (b) a history of items recently viewed by the user, (c) the user's item ratings profile (if any), (d) the current contents of the user's personal shopping cart(s), and (e) a listing of items that were recently (e.g., within the last six months) removed from the shopping cart(s) without being purchased ("recent shopping cart contents"). If a given user has multiple shopping carts, the purchase history for that user may include information about the particular shopping cart used to make each purchase; preserving such information allows the Recommendation Service to be configured to generate recommendations that are specific to a particular shopping cart.

As depicted by FIG. 1, the Web server 32 communicates with various external components 40 of the site. These external components 40 include, for example, a search engine and associated database (not shown) for enabling users to interactively search the catalog for particular items. Also included within the external components 40 are various order processing modules (not shown) for accepting and processing orders, and for updating the purchase histories of the users.

The external components 40 also include a shopping cart process (not shown) which adds and removes items from the users' personal shopping carts based on the actions of the respective users. (The term "process" is used herein to refer generally to one or more code modules that are executed by a computer system to perform a particular task or set of related tasks.) In one embodiment, the shopping cart process periodically "prunes" the personal shopping cart listings of items that are deemed to be dormant, such as items that have not been purchased or viewed by the particular user for a predetermined period of time (e.g. Two weeks). The shopping cart process also preferably generates and maintains the user-specific listings of recent shopping cart contents.

The external components 40 also include recommendation service components 44 that are used to implement the site's various recommendation services. Recommendations generated by the recommendation services are returned to the Web server 32, which incorporates the recommendations into personalized Web pages transmitted to users.

The recommendation service components 44 include a BookMatcher application 50 which implements the above-described BookMatcher service. Users of the BookMatcher service are provided the opportunity to rate individual book titles from a list of popular titles. The book titles are rated according to the following scale:

1 = Bad!
2 = Not for me
3 = OK
4 = Liked it
5 = Loved it!

Users can also rate book titles during ordinary browsing of the site. As depicted in FIG. 1, the BookMatcher application 50 records the ratings within the user's items rating profile. For example, if a user of the BookMatcher service gives the book *Into Thin Air* a score of "5," the BookMatcher application 50 would record the item (by ISBN or other identifier) and the score within the user's item ratings profile. The Book- Matcher application 50 uses the users' item ratings profiles to generate personal recommendations, which can be requested by the user by selecting an appropriate hyperlink. As described in detail below, the item ratings profiles are also used by an "Instant Recommendations" implementation of the Recommendation Service.

The recommendation services components 44 also include a recommendation process 52, a similar items table 60, and an off-line table generation process 66, which collectively implement the Recommendation Service. As depicted by the arrows in FIG. 1, the recommendation process 52 generates personal recommendations based on information stored within the similar items table 60, and based on the items that are known to be of interest ("items of known interest") to the particular user.

In the embodiments described in detail below, the items of known interest are identified based on information stored in the user's profile, such as by selecting all items purchased by the user, the items recently viewed by the user, or all items in the user's shopping cart. In other embodiments of the invention, other types of methods or sources of information could be used to identify the items of known interest. For example, in a service used to recommend Web sites, the items (Web sites) known to be of interest to a user could be identified by parsing a Web server access log and/or by extracting URLs from the "favorite places" list of the user's Web browser. In a service used to recommend restaurants, the items (restaurants) of known interest could be identified by parsing the user's credit card records to identify restaurants that were visited more than once.

The various processes 50, 52, 66 of the recommendation services may run, for example, on one or more Unix or NT based workstations or physical servers (not shown) of the Web site 30. The similar items table 60 is preferably stored as a B-tree data structure to permit efficient look-up, and may be replicated across multiple machines (together with the associated code of the recommendation process 52) to accommodate heavy loads.

II. Similar Items Table (FIG. 1)

The general form and content of the similar items table 60 will now be described with reference to FIG. 1. As this table can take on many alternative forms, the details of the table are intended to illustrate, and not limit, the scope of the invention.

As indicated above, the similar items table 60 maps items to lists of similar items based at least upon the collective interests of the community of users. The similar items table 60 is preferably generated periodically (e.g., once per week) by the off-line table generation process 66. The table generation process 66 generates the table 60 from data that reflects the collective interests of the community of users. In the initial embodiment described in detail herein, the similar items table is generated exclusively from the purchase histories of the community of users (as depicted in FIG. 1), and more specifically, by identifying correlations between purchases of items. In an embodiment described in section IV-B below, the table is generated based on the product viewing histories of the community of users, and more specifically, by identifying correlations between item viewing events. These and other indicia of item relatedness may be appropriately combined for purposes of generating the table 60.

Further, in other embodiments, the table 60 may additionally or alternatively be generated from other indicia of user-item interests, including indicia based on users viewing activities, shopping cart activities, and item rating profiles. For example, the table 60 could be built exclusively from the present and/or recent shopping cart contents of users (e.g., products A and B are similar because a significant portion of those who put A in their shopping carts also put B in their shopping carts). The similar items table 60 could also reflect non-collaborative type item similarities, including content-based similarities derived by comparing item contents or descriptions.

Each entry in the similar items table 60 is preferably in the form of a mapping of a popular item 62 to a corresponding list 64 of similar items ("similar items lists"). As used herein, a "popular" item is an item which satisfies some pre-specified popularity criteria. For example, in the embodiment described herein, an item is treated as popular of it has been purchased by more than 30 customers during the life of the Web site. Using this criteria produces a set of popular items (and thus a recommendation service) which grows over time. The similar items list 64 for a given popular item 62 may include other popular items.

In other embodiments involving sales of products, the table 60 may include entries for most or all of the products of the online merchant, rather than just the popular items. In the embodiments described herein, several different types of items (books, CDs, videos, etc.) are reflected within the same table 60, although separate tables could alternatively be generated for each type of item.

Each similar items list 64 consists of the N (e.g., 20) items which, based on correlations between purchases of items, are deemed to be the most closely related to the respective popular item 62. Each item in the similar items list 64 is stored together with a commonality index ("CI") value which indicates the relatedness of that item to the popular item 62, based on sales of the respective items. A relatively high commonality index for a pair of items ITEM A and ITEM B indicates that a relatively large percentage of users who bought ITEM A also bought ITEM B (and vice versa). A relatively low commonality index for ITEM A and ITEM B indicates that a relatively small percentage of the users who bought ITEM A also bought ITEM B (and vice versa). As described below, the similar items lists are generated, for each popular item, by selecting the N other items that have the highest commonality index values. Using this method, ITEM A may be included in ITEM B's similar items list even though ITEM B in not present in ITEM A's similar items list.

In the embodiment depicted by FIG. 1, the items are represented within the similar items table 60 using product IDs, such as ISBNs or other identifiers. Alternatively, the items could be represented within the table by title ID, where each title ID corresponds to a given "work" regardless of its media format. In either case, different items which correspond to the same work, such as the hardcover and paperback versions of a given book or the VCR cassette and DVD versions of a given video, are preferably treated as a unit for purposes of generating recommendations.

Although the recommendable items in the described system are in the form of book titles, music titles, videos titles, and other types of products, it will be appreciated that the underlying methods and data structures can be used to recommend a wide range of other types of items.

III. General Process for Generating Recommendations Using Similar Items Table (FIG. 2)

The general sequence of steps that are performed by the recommendation process 52 to generate a set of personal recommendations will now be described with reference to FIG. 2. This process, and the more specific implementations of the process depicted by FIGS. 5 and 7 (described below), are intended to illustrate, and not limit, the scope of the invention. Further, as will be recognized, this process may be used in combination with any of the table generation methods described herein (purchase history based, viewing history based, shopping cart based, etc.).

Figure 2:
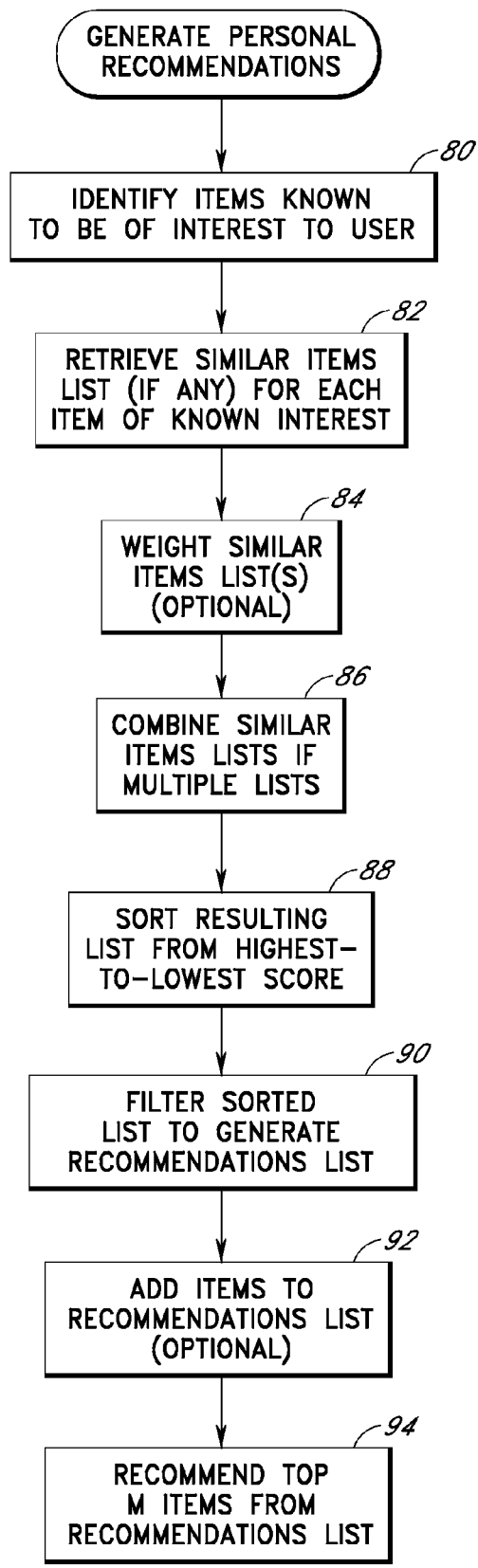
FIG. 2 illustrates a sequence of steps that are performed by the recommendation process of FIG. 1 to generate personalized recommendations.

The FIG. 2 process is preferably invoked in real-time in response to an online action of the user. For example, in an Instant Recommendations implementation (FIGS. 5 and 6) of the service, the recommendations are generated and displayed in real-time (based on the user's purchase history and/or item ratings profile) in response to selection by the user of a corresponding hyperlink, such as a hyperlink which reads "Instant Book Recommendations" or "Instant Music Recommendations." In a shopping cart based implementation (FIG. 7), the recommendations are generated (based on the user's current and/or recent shopping cart contents) in real-time when the user initiates a display of a shopping cart, and are displayed on the same Web page as the shopping cart contents. In a Session Recommendations implementation (FIGS. 8-11), the recommendations are based on the products (e.g., product detail pages) recently viewed by the user—preferably during the current browsing session. The Instant Recommendations, shopping cart recommendations, and Session Recommendation embodiments are described below in sections V-A, V-B and V-C, respectively.

Any of a variety of other methods can be used to initiate the recommendations generation process and to display or otherwise convey the recommendations to the user. For example, the recommendations can automatically be generated periodically and sent to the user by e-mail, in which case the e-mail listing may contain hyperlinks to the product information pages of the recommended items. Further, the personal recommendations could be generated in advance of any request or action by the user, and cached by the Web site 30 until requested.

As illustrated by FIG. 2, the first step (step 80) of the recommendations-generation process involves identifying a set of items that are of known interest to the user. The "knowledge" of the user's interest can be based on explicit indications of interest (e.g., the user rated the item highly) or implicit indications of interest (e.g., the user added the item to a shopping cart or viewed the item). Items that are not "popular items" within the similar items table 60 can optionally be ignored during this step.

In the embodiment depicted in FIG. 1, the items of known interest are selected from one or more of the following groups: (a) items in the user's purchase history (optionally limited to those items purchased from a particular shopping cart); (b) items in the user's shopping cart (or a particular shopping cart designated by the user), (c) items rated by the user (optionally with a score that exceeds a certain threshold, such as two), and (d) items in the "recent shopping cart contents" list associated with a given user or shopping cart. In other embodiments, the items of known interest may additionally or alternatively be selected based on the viewing activities of the user. For example, the recommendations process 52 could select items that were viewed by the user for an extended period of time, viewed more than once, or viewed during the current session. Further, the user could be prompted to select items of interest from a list of popular items.

For each item of known interest, the service retrieves the corresponding similar items list 64 from the similar items table 60 (step 82), if such a list exists. If no entries exist in the table 60 for any of the items of known interest, the process 52 may be terminated; alternatively, the process could attempt to identify additional items of interest, such as by accessing other sources of interest information.

In step 84, the similar items lists 64 are optionally weighted based on information about the user's affinity for the corresponding items of known interest. For example, a similar items list 64 may be weighted heavily if the user gave the corresponding popular item a rating of "5" on a scale or 1-5, or if the user purchased multiple copies of the item. Weighting a similar items list 64 heavily has the effect of increasing the likelihood that the items in that list we be included in the recommendations ultimately presented to the user. In one implementation described below, the user is presumed to have a greater affinity for recently purchased items over earlier purchased items. Similarly, where viewing histories are used to identify items of interest, items viewed recently may be weighted more heavily than earlier viewed items.

The similar items lists 64 are preferably weighted by multiplying the commonality index values of the list by a weighting value. The commonality index values as weighted by any applicable weighting value are referred to herein as "scores." In some embodiments, the recommendations may be generated without weighting the similar items lists 64 (as in the Shopping Cart recommendations implementation described below).

If multiple similar items lists 64 are retrieved in step 82, the lists are appropriately combined (step 86), preferably by merging the lists while summing or otherwise combining the scores of like items. The resulting list is then sorted (step 88) in order of highest-to-lowest score. By combining scores of like items, the process takes into consideration whether an item is similar to more than one of the items of known interest. For example, an item that is related to two or more of the items of known interest will generally be ranked more highly than (and thus recommended over) an item that is related to only one of the items of known interest. In another embodiment, the similar items lists are combined by taking their intersection, so that only those items that are similar to all of the items of known interest are retained for potential recommendation to the user.

In step 90, the sorted list is preferably filtered to remove unwanted items. The items removed during the filtering process may include, for example, items that have already been purchased or rated by the user, and items that fall outside any product group (such as music or books), product category (such as non-fiction), or content rating (such as PG or adult) designated by the user. The filtering step could alternatively be performed at a different stage of the process, such as during the retrieval of the similar items lists from the table 60. The result of step 90 is a list ("recommendations list") of other items to be recommended to the user.

In step 92, one or more additional items are optionally added to the recommendations list. In one embodiment, the items added in step 92 are selected from the set of items (if any) in the user's "recent shopping cart contents" list. As an important benefit of this step, the recommendations include one or more items that the user previously considered purchasing but did not purchase. The items added in step 92 may additionally or alternatively be selected using another recommendations method, such as a content-based method.

Finally, in step 94, a list of the top M (e.g., 15) items of the recommendations list are returned to the Web server 32 (FIG. 1). The Web server incorporates this list into one or more Web pages that are returned to the user, with each recommended item being presented as a hypertextual link to the item's product information page. The recommendations may alternatively be conveyed to the user by email, facsimile, or other transmission method. Further, the recommendations could be presented as advertisements for the recommended items.

IV. Generation of Similar Items Table (FIGS. 3 and 4)

The table-generation process 66 is preferably executed periodically (e.g., once a week) to generate a similar items table 60 that reflects the most recent purchase history data (FIG. 3A), the most recent product viewing history data (FIG. 3B), and/or other types of browsing activities that reflect item interests of users. The recommendation process 52 uses the most recently generated version of the table 60 to generate recommendations.

IV-A. Use of Purchase Histories to Identify Related Items (FIG. 3A)

Figure 3A:
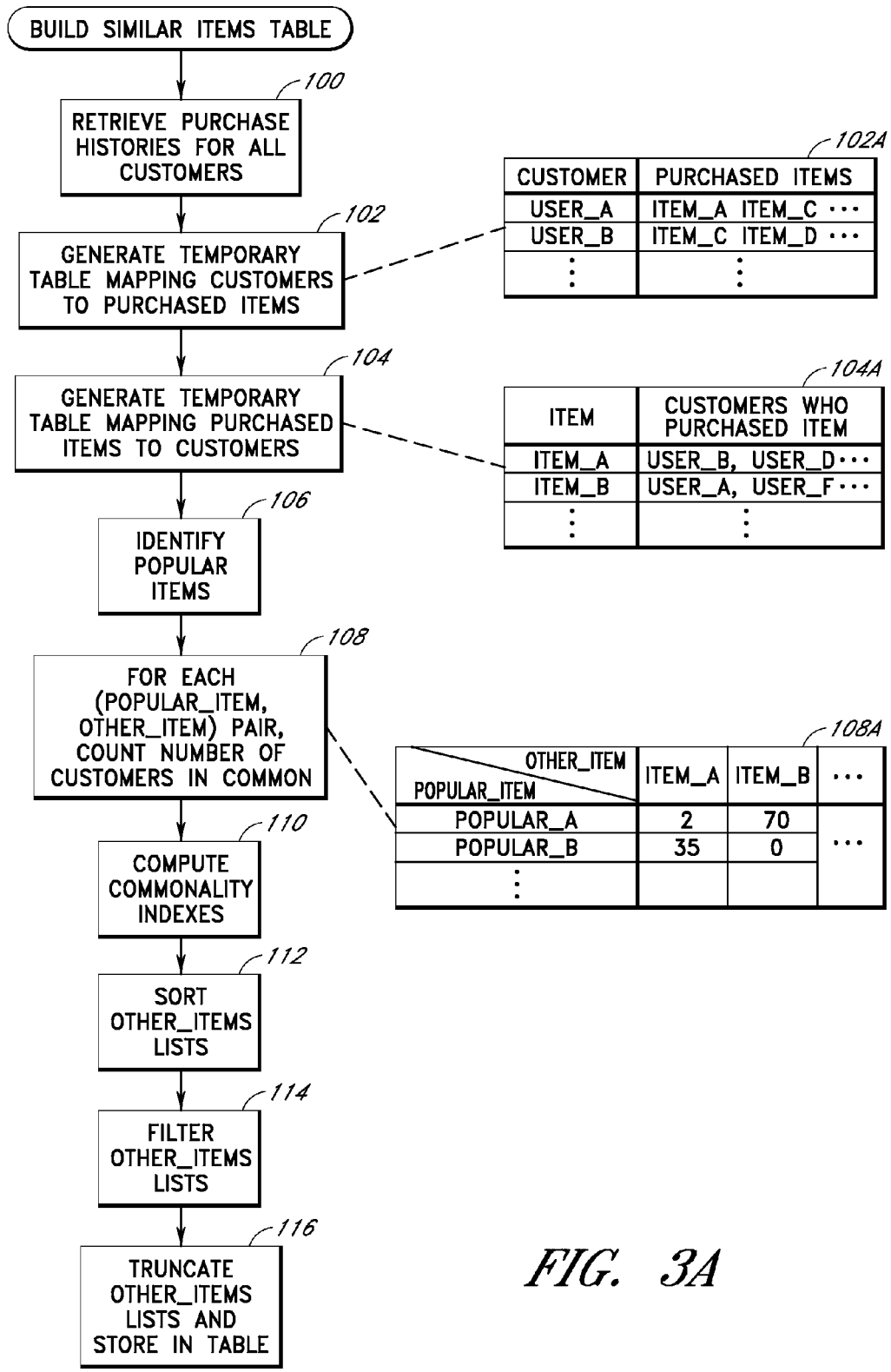
FIG. 3A illustrates one method for generating the similar items table shown in FIG. 1.
Figure 3B:
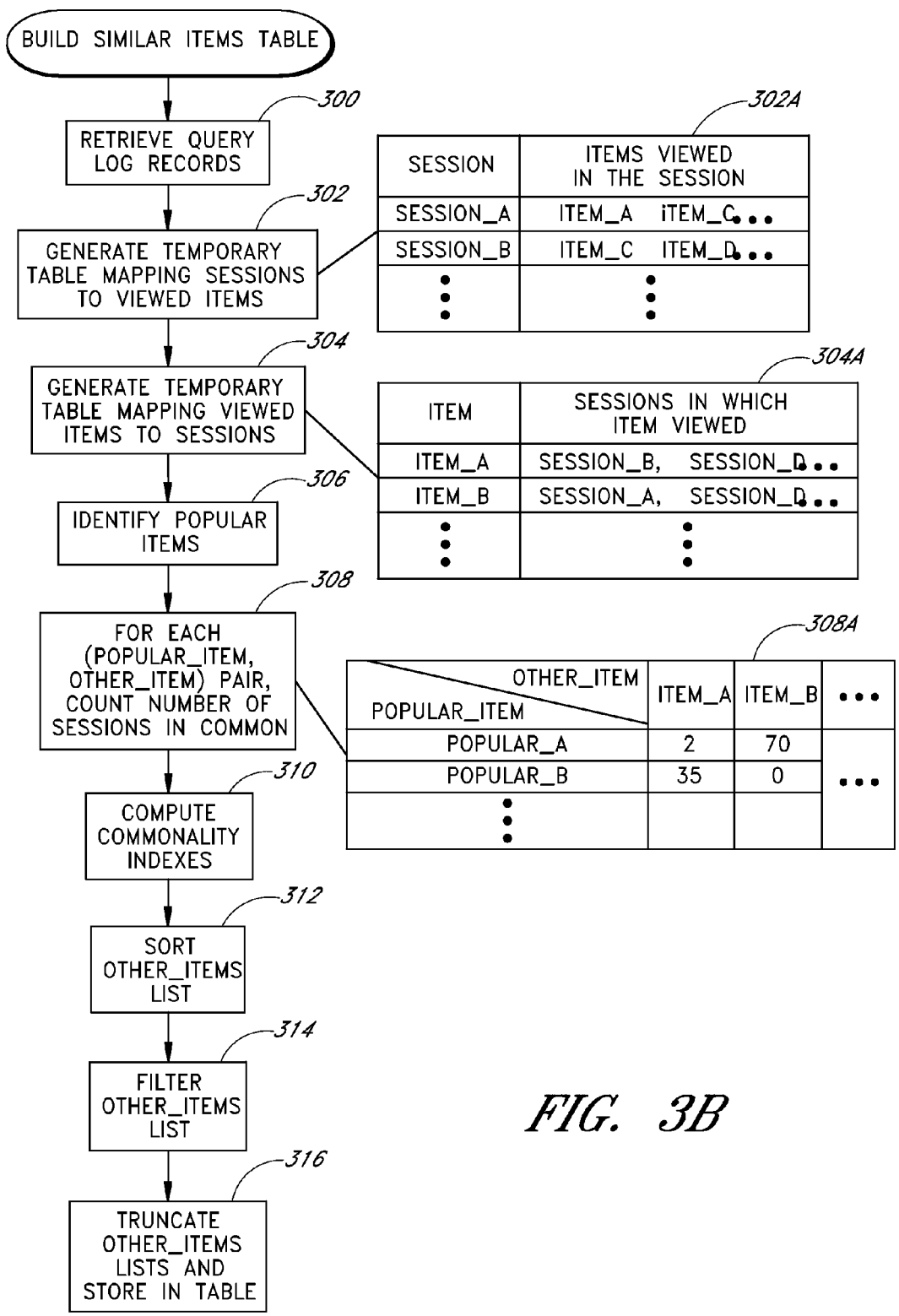
FIG. 3B illustrates another method the generating the similar items table of FIG. 1.
Figure 4:
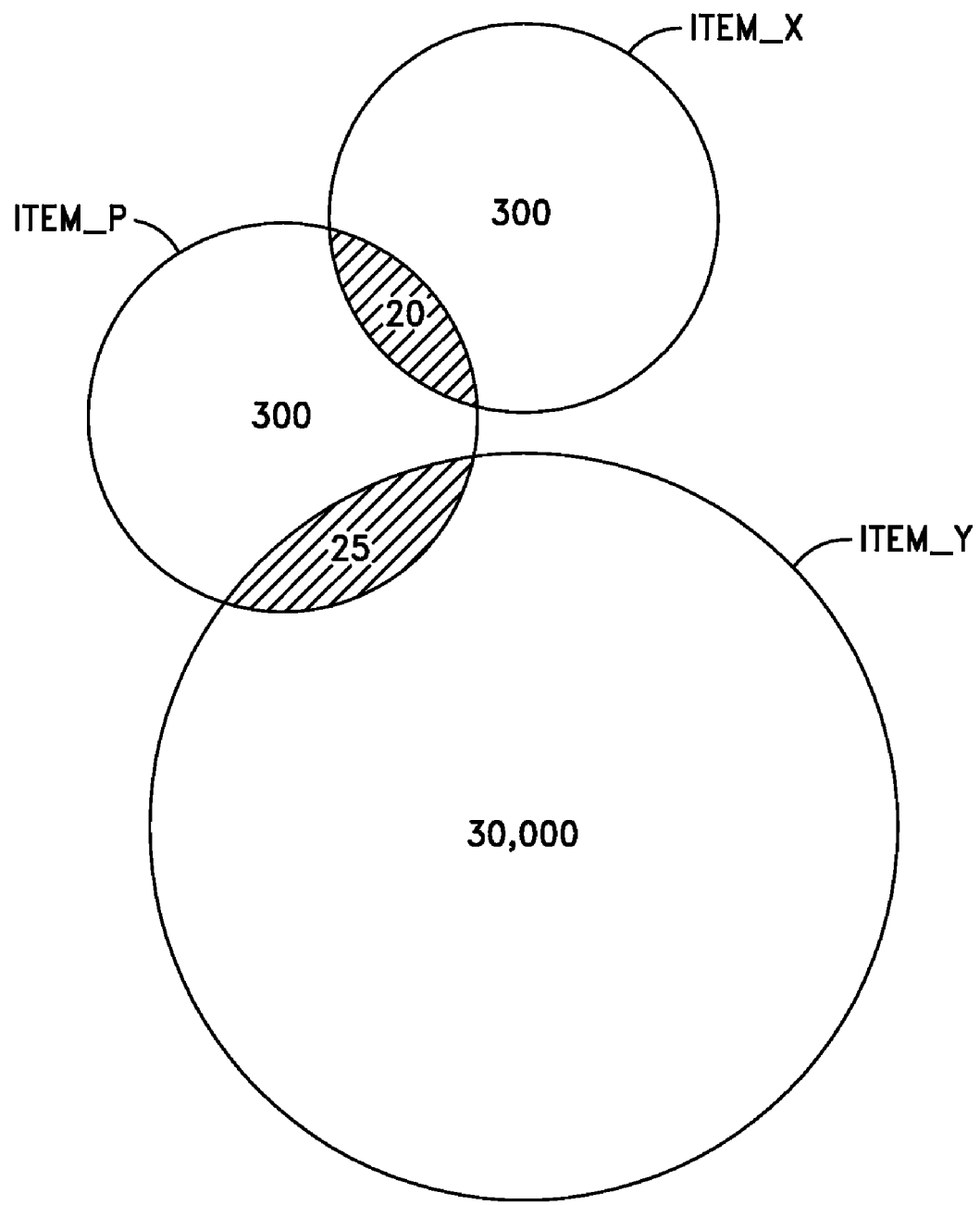
FIG. 4 is a Venn diagram illustrating a hypothetical purchase history or viewing history profile of three items.

FIG. 3A illustrates the sequence of steps that are performed by the table generation process 66 to build the similar items table 60 using purchase history data. An item-viewing-history based embodiment of the process is depicted in FIG. 3B and is described separately below. The general form of temporary data structures that are generated during the process are shown at the right of the drawing. As will be appreciated by those skilled in the art, any of a variety of alternative methods could be used to generate the table 60.

As depicted by FIG. 3A, the process initially retrieves the purchase histories for all customers (step 100). Each purchase history is in the general form of the user ID of a customer together with a list of the product IDs (ISBNs, etc.) of the items (books, CDs, videos, etc.) purchased by that customer. In embodiments which support multiple shopping carts within a given account, each shopping cart could be treated as a separate customer for purposes of generating the table. For example, if a given user (or group of users that share an account) purchased items from two different shopping carts within the same account, these purchases could be treated as the purchases of separate users.

The product IDs may be converted to title IDs during this process, or when the table 60 is later used to generate recommendations, so that different versions of an item (e.g., hardcover and paperback) are represented as a single item. This may be accomplished, for example, by using a separate database which maps product IDs to title IDs. To generate a similar items table that strongly reflects the current tastes of the community, the purchase histories retrieved in step 100 can be limited to a specific time period, such as the last six months.

In steps 102 and 104, the process generates two temporary tables 102A and 104A. The first table 102A maps individual customers to the items they purchased. The second table 104A maps items to the customers that purchased such items. To avoid the effects of "ballot stuffing," multiple copies of the same item purchased by a single customer are represented with a single table entry. For example, even if a single customer purchased 4000 copies of one book, the customer will be treated as having purchased only a single copy. In addition, items that were sold to an insignificant number (e.g., <15) of customers are preferably omitted or deleted from the tables 102A, 104B.

In step 106, the process identifies the items that constitute "popular" items. This may be accomplished, for example, by selecting from the item-to-customers table 104A those items that were purchased by more than a threshold number (e.g., 30) of customers. In the context of a merchant Web site such as that of Amazon.com, Inc., the resulting set of popular items may contain hundreds of thousands or millions of items.

In step 108, the process counts, for each (popular_item, other_item) pair, the number of customers that are in common. A pseudocode sequence for performing this step is listed in Table 1. The result of step 108 is a table that indicates, for each (popular_item, other_item) pair, the number of customers the two have in common. For example, in the hypothetical table 108A of FIG. 3A, POPULAR_A and ITEM_B have seventy customers in common, indicating that seventy customers bought both items.

TABLE 1 for each popular_item
  for each customer in customers of item
    for each other_item in items of customer
      increment common-customer-count(popular_item, other_item)

In step 110, the process generates the commonality indexes for each (popular_item, other_item) pair in the table 108A. As indicated above, the commonality index (CI) values are measures of the similarity between two items, with larger CI values indicating greater degrees of similarity. The commonality indexes are preferably generated such that, for a given popular_item, the respective commonality indexes of the corresponding other_items take into consideration both (a) the number of customers that are common to both items, and (b) the total number of customers of the other_item. A preferred method for generating the commonality index values is set forth in equation (1) below, where $N_{common}$ is the number of users who purchased both A and B, sqrt is a square-root operation, $N_A$ is the number of users who purchased A, and $N_B$ is the number of users who purchased B.

$$CI(item\_A, item\_B) = N_{common}/\sqrt{N_A \times N_B} \quad \text{Equation (1)}$$

FIG. 4 illustrates this method in example form. In the FIG. 4 example, item_P (a popular_item) has two "other_items," item_X and item_Y. Item_P has been purchased by 300 customers, item_X by 300 customers, and item_Y by 30,000 customers. In addition, item_P and item_X have 20 customers in common, and item_P and item_Y have 25 customers in common. Applying the equation above to the values shown in FIG. 4 produces the following results:

$$CI(item\_P, item\_X) = 20/\sqrt{300 \times 300} = 0.0667$$

$$CI(item\_P, item\_Y) = 25/\sqrt{300 \times 30{,}000} = 0.0083$$

Thus, even though items P and Y have more customers in common than items P and X, items P and X are treated as being more similar than items P and Y. This result desirably reflects the fact that the percentage of item_X customers that bought item_P (6.7%) is much greater than the percentage of item_Y customers that bought item_P (0.08%).

Because this equation is symmetrical (i.e., CI(item_A, item_B)=CI(item_B, item_A)), it is not necessary to separately calculate the CI value for every location in the table 108A. In other embodiments, an asymmetrical method may be used to generate the CI values. For example, the CI value for a (popular_item, other_item) pair could be generated as (customers of popular_item and other_item)/(customers of other_item).

Following step 110 of FIG. 3A, each popular_item has a respective "other_items" list which includes all of the other_items from the table 108A and their associated CI values. In step 112, each other_items list is sorted from highest-to-lowest commonality index. Using the FIG. 4 values as an example, item_X would be positioned closer to the top of the item_B's list than item_Y, since 0.014907>0.001643.

In step 114, the sorted other_items lists are filtered by deleting all list entries that have fewer than 3 customers in common. For example, in the other_items list for POPULAR_A in table 108A, ITEM_A would be deleted since POPULAR_A and ITEM_A have only two customers in common. Deleting such entries tends to reduce statistically poor correlations between item sales. In step 116, the sorted other_items lists are truncated to length N to generate the similar items lists, and the similar items lists are stored in a B-tree table structure for efficient look-up.

IV-B. Use of Product Viewing Histories to Identify Related Items (FIG. 3b)

One limitation with the process of FIG. 3A is that it is not well suited for determining the similarity or relatedness between products for which little or no purchase history data exists. This problem may arise, for example, when the online merchant adds new products to the online catalog, or carries expensive or obscure products that are infrequently sold. The problem also arises in the context of online systems that merely provide information about products without providing an option for users to purchase the products (e.g., the Web site of Consumer Reports).

Another limitation is that the purchase-history based method is generally incapable of identifying relationships between items that are substitutes for (purchased in place of) each other. Rather, the identified relationships tend to be exclusively between items that are complements (i.e., one is purchased in addition to the other).

In accordance with one aspect of the invention, these limitations are overcome by incorporating user-specific (and preferably session-specific) product viewing histories into the process of determining product relatedness. Specifically, the Web site system is designed to store user click stream or query log data reflecting the products viewed by each user during ordinary browsing of the online catalog. This may be accomplished, for example, by recording the product detail pages viewed by each user. Products viewed on other areas of the site, such as on search results pages and browse node pages, may also be incorporated into the users' product viewing histories.

During generation of the similar items table 60, the user-specific viewing histories are analyzed, preferably using a similar process to that used to analyze purchase history data (FIG. 3A), as an additional or an alternative measure of product similarity. For instance, if a relatively large percentage of the users who viewed product A also viewed product B, products A and B may be deemed sufficiently related to be included in each other's similar items lists. The product viewing histories may be analyzed on a per session basis (i.e., only take into account those products viewed during the same session), or on a multi-session basis (e.g., take into consideration co-occurrences of products within the entire recorded viewing of browsing history of each user). Other known metrics of product similarity, such as those based on user purchase histories or a content based analysis, may be incorporated into the same process to improve reliability.

An important benefit to incorporating item viewing histories into the item-to-item mapping process is that relationships can be determined between items for which little or no purchase history data exists (e.g., an obscure product or a newly released product). As a result, relationships can typically be identified between a far greater range of items than is possible with a pure purchase-based approach.

Another important benefit to using viewing histories is that the item relationships identified include relationships between items that are pure substitutes. For example, the purchase-based item-to-item similarity mappings ordinarily would not map one large-screen TV to another large-screen TV, since it is rare that a single customer would purchase more than one large-screen TV. On the other hand, a mapping that reflects viewing histories would likely link two large-screen TVs together since it is common for a customer to visit the detail pages of multiple large-screen TVs during the same browsing session.

The query log data used to implement this feature may optionally incorporate browsing activities over multiple Web sites (e.g., the Web sites of multiple, affiliated merchants). Such multi-site query log data may be obtained using any of a variety of methods. One known method is to have the operator of Web site A incorporate into a Web page of Web site A an object served by Web site B (e.g., a small graphic). With this method, any time a user accesses this Web page (causing the object to be requested from Web site B), Web site B can record the browsing event. Another known method for collecting multi-site query log data is to have users download a browser plug-in, such as the plug-in provided by Alexa Internet Inc., that reports browsing activities of users to a central server. The central server then stores the reported browsing activities as query log data records. Further, the entity responsible for generating the similar items table could obtain user query log data through contracts with ISPs, merchants, or other third party entities that provide Web sites for user browsing.

Although the term "viewing" is used herein to refer to the act of accessing product information, it should be understood that the user does not necessarily have to view the information about the product. Specifically, some merchants support the ability for users to browse their electronic catalogs by voice. For example, in some systems, users can access voiceXML versions of the site's Web pages using a telephone connection to a voice recognition and synthesis system. In such systems, a user request for voice-based information about a product may be treated as a product viewing event.

FIG. 3B illustrates a preferred process for generating the similar items table 60 (FIG. 1) from query log data reflecting product viewing events. Methods that may be used to capture the query log data, and identify product viewing events therefrom, are described separately below in section V-C. As will be apparent, the embodiments of FIGS. 3A and 3B can be appropriately combined such that the similarities reflected in the similar items table 60 incorporate both correlations in item purchases and correlations in item viewing events.

As depicted by FIG. 3B, the process initially retrieves the query log records for all browsing sessions (step 300). In one embodiment, only those query log records that indicate sufficient viewing activity (such as more than 5 items viewed in a browsing session) are retrieved. In this embodiment, some of the query log records may correspond to different sessions by the same user. Preferably, the query log records of many thousands of different users are used to build the similar items table 60.

Each query log record is preferably in the general form of a browsing session identification together with a list of the identifiers of the items viewed in that browsing session. The item IDs may be converted to title IDs during this process, or when the table 60 is later used to generate recommendations, so that different versions of an item are represented as a single item. Each query log record may alternatively list some or all of the pages viewed during the session, in which case a look up table may be used to convert page IDs to item or product IDs.

In steps 302 and 304, the process builds two temporary tables 302A and 304A. The first table 302A maps browsing sessions to the items viewed in the sessions. A table of the type shown in FIG. 9 (discussed separately below) may be used for this purpose. Items that were viewed within an insignificant number (e.g., <15) of browsing sessions are preferably omitted or deleted from the tables 302A and 304A. In one embodiment, items that were viewed multiple times within a browsing session are counted as items viewed once within a browsing session.

In step 306, the process identifies the items that constitute "popular" items. This may be accomplished, for example, by selecting from table 304A those items that were viewed within more than a threshold number (e.g., 30) of sessions. In the context of a Web site of a typical online merchant that sells many thousands or millions of different items, the number of popular_items in this embodiment will desirably be far greater than in the purchase-history-based embodiment of FIG. 3A. As a result, similar items lists 64 can be generated for a much greater portion of the items in the online catalog—including items for which little or no sales data exists.

In step 308, the process counts, for each (popular_item, other_item) pair, the number of sessions that are in common. A pseudocode sequence for performing this step is listed in Table 2. The result of step 308 is a table that indicates, for each (popular_item, other_item) pair, the number of sessions the two have in common. For example, in the hypothetical table 308A of FIG. 3B, POPULAR_A and ITEM_B have seventy sessions in common, indicating that in seventy sessions both items were viewed.

TABLE 2

```
for each popular_item
   for each session in sessions of popular_item
      for each other_item in items of session
         increment common-session-count(popular_item, other_item)
```

In step 310, the process generates the commonality indexes for each (popular_item, other_item) pair in the table 308A. The commonality index (CI) values are measures of the similarity or relatedness between two items, with larger CI values indicating greater degrees of similarity. The commonality indexes are preferably generated such that, for a given popular_item, the respective commonality indexes of the corresponding other_items take into consideration the following (a) the number of sessions that are common to both items (i.e, sessions in which both items were viewed), (b) the total number of sessions in which the other_item was viewed, and (c) the number of sessions in which the popular_item was viewed. Equation (1), discussed above, may be used for this purpose, but with the variables redefined as follows: $N_{common}$, is the number of sessions in which both A and B were viewed, $N_A$ is the number of sessions in which A was viewed, and $N_B$ is the number of sessions in which B was viewed. Other calculations that reflect the frequency with which A and B co-occur within the product viewing histories may alternatively be used.

FIG. 4 illustrates this method in example form. In the FIG. 4 example, item_P (a popular_item) has two "other_items," item_X and item_Y. Item_P has been viewed in 300 sessions, item_X in 300 sessions, and item_Y in 30,000 sessions. In addition, item_P and item_X have 20 sessions in common, and item_P and item_Y have 25 sessions in common. Applying the equation above to the values shown in FIG. 4 produces the following results:

$$CI(item\_P, item\_X) = 20/sqrt(300 \times 300)) = 0.0667$$

$$CI(item\_P, item\_Y) = 25/sqrt(300 \times 30,000)) = 0.0083$$

Thus, even though items P and Y have more sessions in common than items P and X, items P and X are treated as being more similar than items P and Y. This result desirably reflects the fact that the percentage of item_X sessions in which item_P was viewed (6.7%) is much greater than the percentage of item_Y sessions in which item_P was viewed (0.08%).

Because this equation is symmetrical (i.e., CI(item_A, item_B)=CI(item_B, item_A)), it is not necessary to separately calculate the CI value for every location in the table 308A. As indicated above, an asymmetrical method may alternatively be used to generate the CI values.

Following step 310 of FIG. 3B, each popular item has a respective "other_items" list which includes all of the other_items from the table 308A and their associated CI values. In step 312, each other_items list is sorted from highest-to-lowest commonality index. Using the FIG. 4 values as an example, item_X would be positioned closer to the top of the item_B's list than item_Y, since 0.014907>0.001643. In step 314, the sorted other_items lists are filtered by deleting all list entries that have fewer than a threshold number of sessions in common (e.g., 3 sessions).

In one embodiment, the items in the other_items list are weighted to favor some items over others. For example, items that are new releases may be weighted more heavily than older items. For items in the other_items list of a popular item, their CI values are preferably multiplied by the corresponding weights. Therefore, the more heavily weighted items (such as new releases) are more likely to be considered related and more likely to be recommended to users.

In step 316, the sorted other_items lists are truncated to length N (e.g., 20) to generate the similar items lists, and the similar items lists are stored in a B-tree table structure for efficient look-up.

One variation of the method shown in FIG. 3B is to use multiple-session viewing histories of users (e.g., the entire viewing history of each user) in place of the session-specific product viewing histories. This may be accomplished, for example, by combining the query log data collected from multiple browsing sessions of the same user, and treating this data as one "session" for purposes of the FIG. 3B process. With this variation, the similarity between a pair of items, A and B, reflects whether a large percentage of the users who viewed A also viewed B—during either the same session or a different session.

Another variation is to use the "distance" between two product viewing events as an additional indicator of product relatedness. For example, if a user views product A and then immediately views product B, this may be treated as a stronger indication that A and B are related than if the user merely viewed A and B during the same session. The distance may be measured using any appropriate parameter that can be recorded within a session record, such as time between product viewing events, number of page accesses between product viewing events, and/or number of other products viewed between product viewing events. Distance may also be incorporated into the purchase based method of FIG. 3A.

As with generation of the purchase-history-based similar items table, the viewing-history-based similar items table is preferably generated periodically, such as once per day or once per week, using an off-line process. Each time the table 60 is regenerated, query log data recorded since the table was last generated is incorporated into the process—either alone or in combination with previously-recorded query log data. For example, the temporary tables 302A and 304A of FIG. 3B may be saved from the last table generation event and updated with new query log data to complete the process of FIG. 3B.

IV-C. Determination of Item Relatedness Using Other Types of User Activities

The process flows shown in FIGS. 3A and 3B differ primarily in that they use different types of user actions as evidence of users' interests in a particular items. In the method shown in FIG. 3A, a user is assumed to be interested in an item if the user purchased the item; and in the process shown in 3B, a user is assumed to be interested in an item if the user viewed the item. Any of a variety of other types of user actions that evidence a user's interest in a particular item may additionally or alternatively be used, alone or in combination, to generate the similar items table 60. The following are examples of other types of user actions that may be used for this purpose.

(1) Placing an item in a personal shopping cart. With this method, products A and B may be treated as similar if a large percentage of those who put A in an online shopping cart also put B in the shopping cart. As with product viewing histories, the shopping cart contents histories of users may be evaluated on a per session basis (i.e., only consider items placed in the shopping cart during the same session), on a multiple-session basis (e.g., consider the entire shopping cart contents history of each user as a unit), or using another appropriate method (e.g., only consider items that were in the shopping cart at the same time).

(2) Placing a bid on an item in an online auction. With this method, products A and B may be treated as related if a large percentage of those who placed a bid on A also placed a bid on B. The bid histories of users may be evaluated on a per session basis or on a multiple-session basis. The table generated by this process may, for example, be used to recommend related auctions, and/or related retail items, to users who view auction pages.

(3) Placing an item on a wish list. With this method, products A and B may be treated as related if a large percentage of those who placed A on their respective electronic wish lists (or other gift registries) also placed B on their wish lists.

(4) Submitting a favorable review for an item. With this method, products A and B may be treated as related if a large percentage of those who favorably reviewed A also favorably reviewed B. A favorable review may be defined as a score that satisfies a particular threshold (e.g., 4 or above on a scale of 1-5).

(5) Purchasing an item as a gift for someone else. With this method, products A and B may be treated as related if a large percentage of those who purchased A as a gift also purchased B as a gift. This could be especially helpful during the holidays to help customers find more appropriate gifts based on the gift(s) they've already bought.

With the above and other types of item-affinity-evidencing actions, equation (1) above may be used to generate the CI values, with the variables of equation (1) generalized as follows:

$N_{common}$ is the number of users that performed the item-affinity-evidencing action with respect to both item A and item B during the relevant period (browsing session, entire browsing history, etc.);

$N_A$ is the number of users who performed the action with respect to item A during the relevant period; and $N_B$ is the number of users who performed the action with respect to item B during the relevant period.

As indicated above, any of a variety non-user-action-based methods for evaluating similarities between items could be incorporated into the table generation process 66. For example, the table generation process could compare item contents and/or use previously-assigned product categorizations as additional or alternative indicators of item relatedness. An important benefit of the user-action-based methods (e.g., of FIGS. 3A and 3B), however, is that the items need not contain any content that is amenable to feature extraction techniques, and need not be pre-assigned to any categories. For example, the method can be used to generate a similar items table given nothing more than the product IDs of a set of products and user purchase histories and/or viewing histories with respect to these products.

Another important benefit of the Recommendation Service is that the bulk of the processing (the generation of the similar items table 60) is performed by an off-line process. Once this table has been generated, personalized recommendations can be generated rapidly and efficiently, without sacrificing breadth of analysis.

V. Example Uses of Similar Items Table to Generate Personal Recommendations

Three specific implementations of the Recommendation Service, referred to herein as Instant Recommendations, Shopping Basket Recommendations, and Session Recommendations, will now be described in detail. These three implementations differ in that each uses a different source of information to identify the "items of known interest" of the user whose recommendations are being generated. In all three implementations, the recommendations are preferably generated and displayed substantially in real time in response to an action by the user.

Any of the methods described above may be used to generate the similar items tables 60 used in these three service implementations. Further, all three (and other) implementations may be used within the same Web site or other system, and may share the same similar items table 60.

Figure 5:
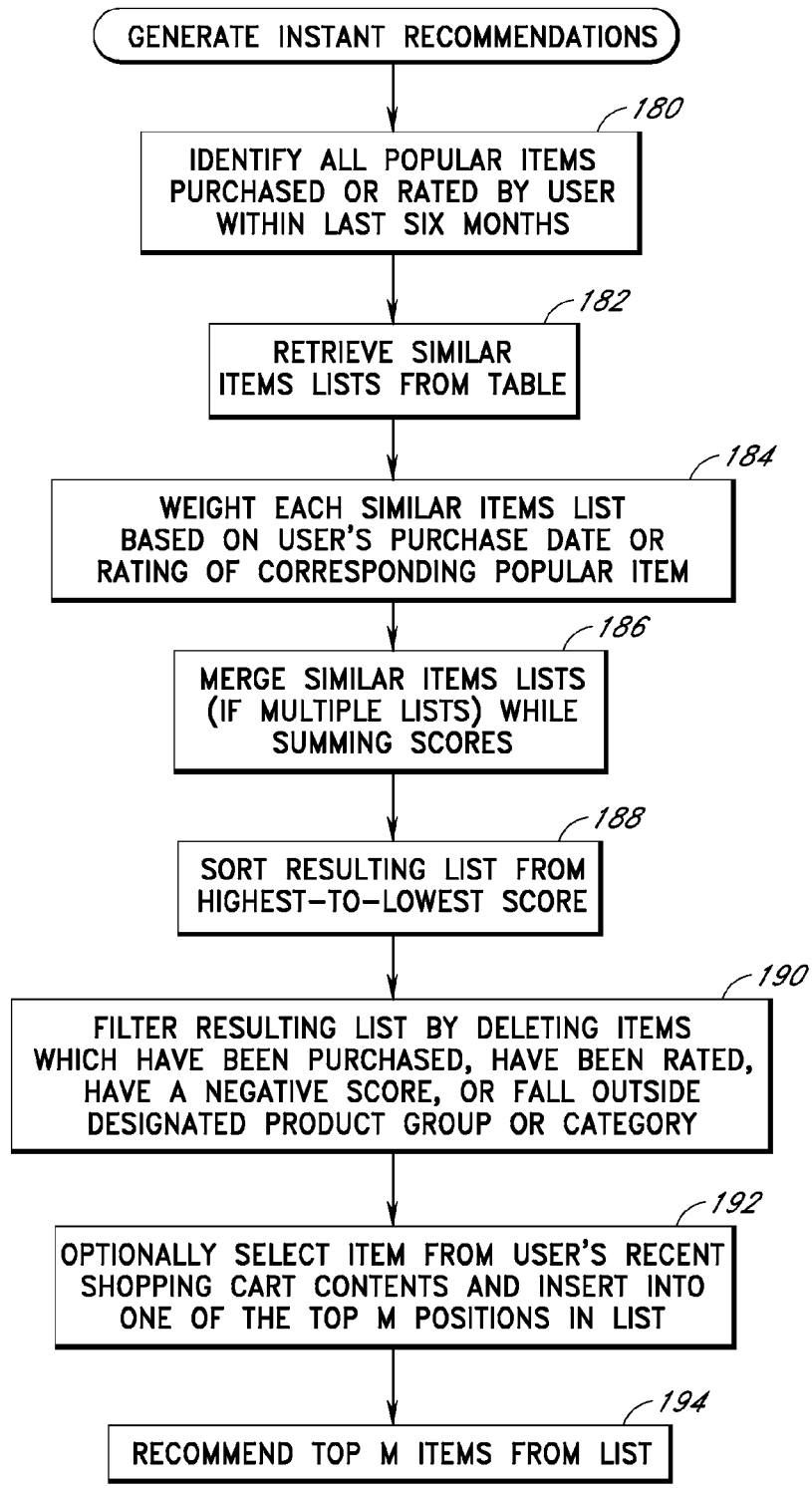
FIG. 5 illustrates one specific implementation of the sequence of steps of FIG. 2.
Figure 6:
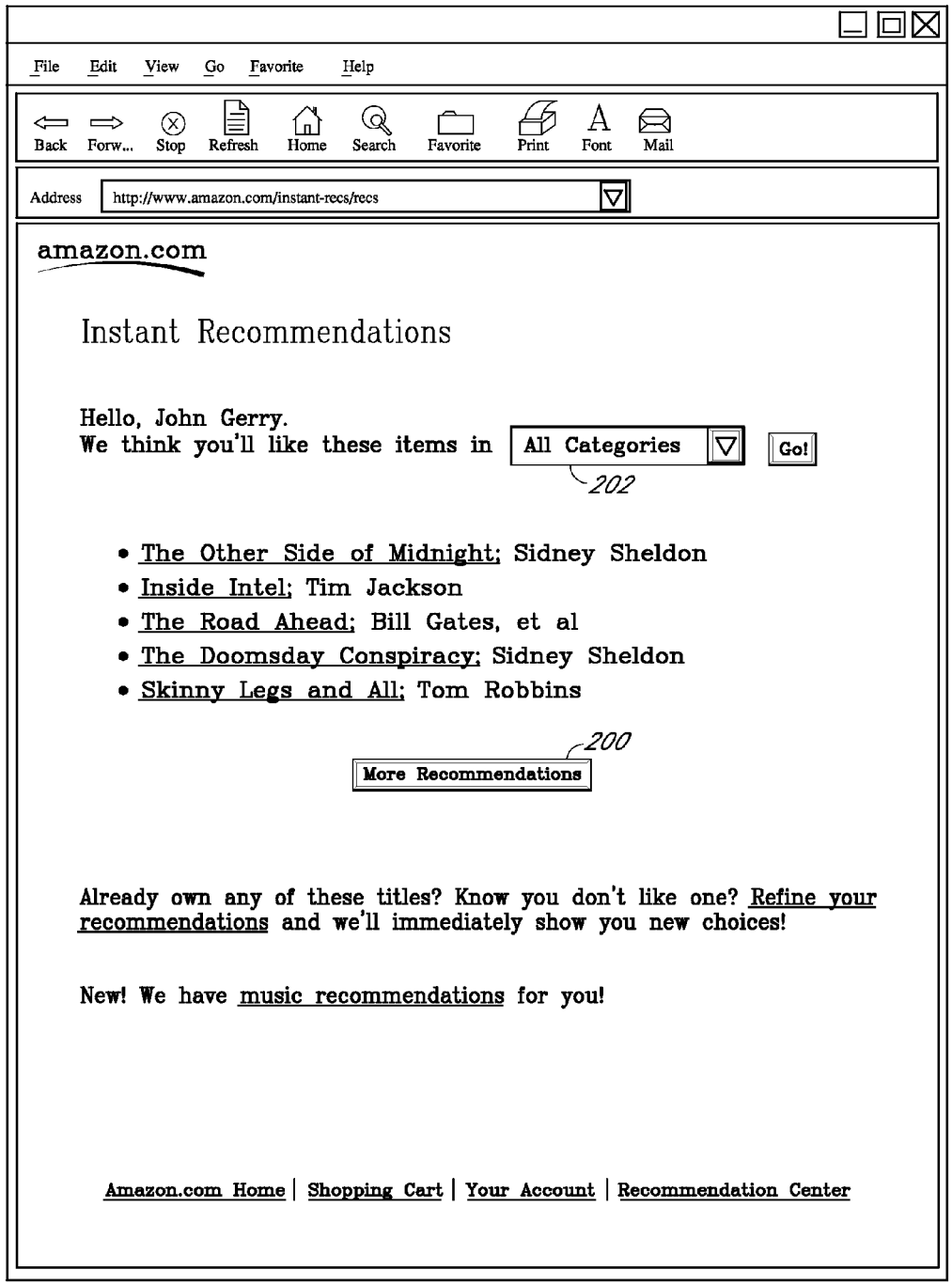
FIG. 6 illustrates the general form of a Web page used to present the recommendations of the FIG. 5 process to the user.

V-A Instant Recommendations Service (FIGS. 5 and 6)

A specific implementation of the Recommendation Service, referred to herein as the Instant Recommendations service, will now be described with reference to FIGS. 5 and 6.

As indicated above, the Instant Recommendations service is invoked by the user by selecting a corresponding hyperlink from a Web page. For example, the user may select an "Instant Book Recommendations" or similar hyperlink to obtain a listing of recommended book titles, or may select a "Instant Music Recommendations" or "Instant Video Recommendations" hyperlink to obtain a listing of recommended music or video titles. As described below, the user can also request that the recommendations be limited to a particular item category, such as "non-fiction," "jazz" or "comedies." The "items of known interest" of the user are identified exclusively from the purchase history and any item ratings profile of the particular user. The service becomes available to the user (i.e., the appropriate hyperlink is presented to the user) once the user has purchased and/or rated a threshold number (e.g. three) of popular items within the corresponding product group. If the user has established multiple shopping carts, the user may also be presented the option of designating a particular shopping cart to be used in generating the recommendations.

FIG. 5 illustrates the sequence of steps that are performed by the Instant Recommendations service to generate personal recommendations. Steps 180-194 in FIG. 5 correspond, respectively, to steps 80-94 in FIG. 2. In step 180, the process 52 identifies all popular items that have been purchased by the user (from a particular shopping cart, if designated) or rated by the user, within the last six months. In step 182, the process retrieves the similar items lists 64 for these popular items from the similar items table 60.

In step 184, the process 52 weights each similar items list based on the duration since the associated popular item was purchased by the user (with recently-purchased items weighted more heavily), or if the popular item was not purchased, the rating given to the popular item by the user. The formula used to generate the weight values to apply to each similar items list is listed in C in Table 2. In this formula, "is purchased" is a boolean variable which indicates whether the popular item was purchased, "rating" is the rating value (1-5), if any, assigned to the popular item by the user, "order_date" is the date/time (measured in seconds since 1970) the popular item was purchased, "now" is the current date/time (measured in seconds since 1970), and "6 months" is six months in seconds.

TABLE 2

1  Weight = ( (is_purchased ? 5 : rating) * 2 − 5) *
2  ( 1 + (max( (is purchased ? order_date : 0) − (now − 6 months), 0 ) )
3  / (6 months))

In line 1 of the formula, if the popular item was purchased, the value "5" (the maximum possible rating value) is selected; otherwise, the user's rating of the item is selected. The selected value (which may range from 1-5) is then multiplied by 2, and 5 is subtracted from the result. The value calculated in line 1 thus ranges from a minimum of −3 (if the item was rated a "1") to a maximum of 5 (if the item was purchased or was rated a "5").

The value calculated in line 1 is multiplied by the value calculated in lines 2 and 3, which can range from a minimum of 1 (if the item was either not purchased or was purchased at least six months ago) to a maximum of 2 (if order_date=now). Thus, the weight can range from a minimum of −6 to a maximum of 10. Weights of zero and below indicate that the user rated the item a "2" or below. Weights higher than 5 indicate that the user actually purchased the item (although a weight of 5 or less is possible even if the item was purchased), with higher values indicating more recent purchases.

The similar items lists 64 are weighted in step 184 by multiplying the CI values of the list by the corresponding weight value. For example, if the weight value for a given popular item is ten, and the similar items list 64 for the popular item is (productid_A, 0.10), (productid_B, 0.09), (productid_C, 0.08), . . .

the weighted similar items list would be:

(productid_A, 1.0), (productid_B, 0.9), (productid_C, 0.8), . . . .

The numerical values in the weighted similar items lists are referred to as "scores."

In step 186, the weighted similar items lists are merged (if multiple lists exist) to form a single list. During this step, the scores of like items are summed. For example, if a given other_item appears in three different similar items lists 64, the three scores (including any negative scores) are summed to produce a composite score.

In step 188, the resulting list is sorted from highest-to-lowest score. The effect of the sorting operation is to place the most relevant items at the top of the list. In step 190, the list is filtered by deleting any items that (1) have already been purchased or rated by the user, (2) have a negative score, or (3) do not fall within the designated product group (e.g., books) or category (e.g., "science fiction," or "jazz").

In step 192 one or more items are optionally selected from the recent shopping cart contents list (if such a list exists) for the user, excluding items that have been rated by the user or which fall outside the designated product group or category. The selected items, if any, are inserted at randomly-selected locations within the top M (e.g., 15) positions in the recommendations list. Finally, in step 194, the top M items from the recommendations list are returned to the Web server 32, which incorporates these recommendations into one or more Web pages.

The general form of such a Web page is shown in FIG. 6, which lists five recommended items. From this page, the user can select a link associated with one of the recommended items to view the product information page for that item. In addition, the user can select a "more recommendations" button 200 to view additional items from the list of M items. Further, the user can select a "refine your recommendations" link to rate or indicate ownership of the recommended items. Indicating ownership of an item causes the item to be added to the user's purchase history listing.

The user can also select a specific category such as "non-fiction" or "romance" from a drop-down menu 202 to request category-specific recommendations. Designating a specific category causes items in all other categories to be filtered out in step 190 (FIG. 5).

Figure 7:
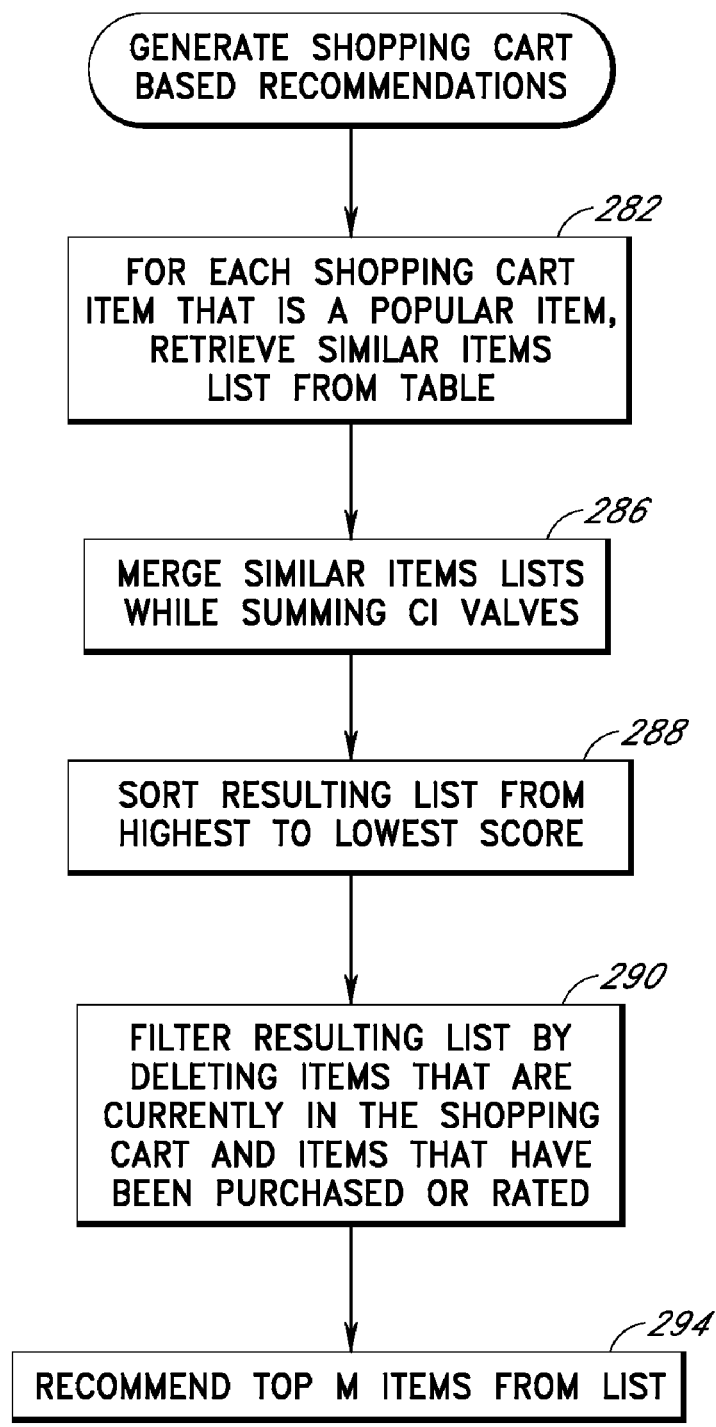
FIG. 7 illustrates another specific implementation of the sequence of steps of FIG. 2.

V-B Shopping Cart Based Recommendations (FIG. 7)

Another specific implementation of the Recommendation Service, referred to herein as Shopping Cart recommendations, will now be described with reference to FIG. 7.

The Shopping Cart recommendations service is preferably invoked automatically when the user displays the contents of a shopping cart that contains more than a threshold number (e.g., 1) of popular items. The service generates the recommendations based exclusively on the current contents of the shopping cart (i.e., only the shopping cart contents are used as the "items of known interest"). As a result, the recommendations tend to be highly correlated to the user's current shopping interests. In other implementations, the recommendations may also be based on other items that are deemed to be of current interest to the user, such as items in the recent shopping cart contents of the user and/or items recently viewed by the user. Further, other indications of the user's current shopping interests could be incorporated into the process. For example, any search terms typed into the site's search engine during the user's browsing session could be captured and used to perform content-based filtering of the recommended items list.

FIG. 7 illustrates the sequence of steps that are performed by the Shopping Cart recommendations service to generate a set of shopping-cart-based recommendations. In step 282, the similar items list for each popular item in the shopping cart is retrieved from the similar items table 60. The similar items list for one or more additional items that are deemed to be of current interest could also be retrieved during this step, such as the list for an item recently deleted from the shopping cart or recently viewed for an extended period of time.

In step 286, these similar items lists are merged while summing the commonality index (CI) values of like items. In step 288, the resulting list is sorted from highest-to-lowest score. In step 290, the list is filtered to remove any items that exist in the shopping cart or have been purchased or rated by the user. Finally, in step 294, the top M (e.g., 5) items of the list are returned as recommendations. The recommendations are preferably presented to the user on the same Web page (not shown) as the shopping cart contents. An important characteristic of this process is that the recommended products tend to be products that are similar to more than one of the products in the shopping cart (since the CI values of like items are combined). Thus, if the items in the shopping cart share some common theme or characteristic, the items recommended to the user will tend to have this same theme or characteristic.

If the user has defined multiple shopping carts, the recommendations generated by the FIG. 7 process may be based solely on the contents of the shopping cart currently selected for display. As described above, this allows the user to obtain recommendations that correspond to the role or purpose of a particular shopping cart (e.g., work versus home).

The various uses of shopping cart contents to generate recommendations as described above can be applied to other types of recommendation systems, including content-based systems. For example, the current and/or past contents of a shopping cart can be used to generate recommendations in a system in which mappings of items to lists of similar items are generated from a computer-based comparison of item contents. Methods for performing content-based similarity analyses of items are well known in the art, and are therefore not described herein.

V-C Session Recommendations (FIGS. 8-12)

One limitation in the above-described service implementations is that they generally require users to purchase or rate products (Instant Recommendations embodiment), or place products into a shopping cart (Shopping Cart Recommendations embodiment), before personal recommendations can be generated. As a result, the recommendation service may fail to provide personal recommendations to a new visitor to the site, even though the visitor has viewed many different items. Another limitation, particularly with the Shopping Cart Recommendations embodiment, is that the service may fail to identify the session-specific interests of a user who fails to place items into his or her shopping cart.

In accordance with another aspect of the invention, these limitations are overcome by providing a Session Recommendations service that stores a history or "click stream" of the products viewed by a user during the current browsing session, and uses some or all of these products as the user's "items of known interest" for purposes of recommending products to the user during that browsing session. Preferably, the recommended products are displayed on a personalized Web page (FIG. 11) that provides an option for the user to individually "deselect" the viewed products from which the recommendations have been derived. For example, once the user has viewed products A, B and C during a browsing session, the user can view a page listing recommended products derived by combining the similar items lists for these three products. While viewing this personal recommendations page, the user can de-select one of the three products to effectively remove it from the set of items of known interest, and then view recommendations derived from the remaining two products.

The click-stream data used to implement this service may optionally incorporate product browsing activities over multiple Web sites. For example, when a user visits one merchant Web site followed by another, the two visits may be treated as a single "session" for purposes of generating personal recommendations.

Figure 8:
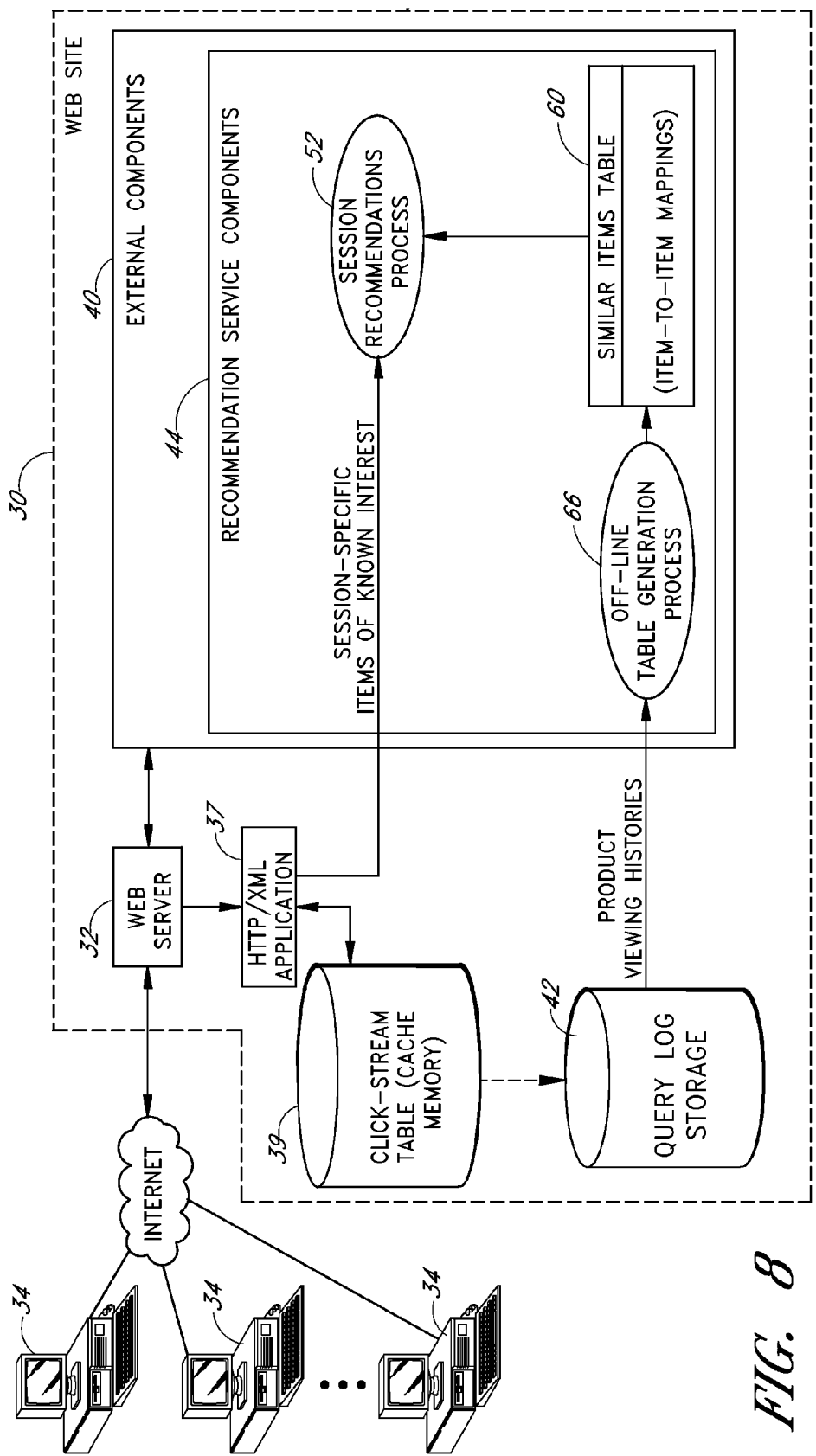
FIG. 8 illustrates components and the data flow of a Web site that records data reflecting product viewing histories of users, and which uses this data to provide session-based recommendations.

FIG. 8 illustrates the components that may be added to the system of FIG. 1 to record real time session data reflecting product viewing events, and to use this data to provide session-specific recommendation of the type shown in FIG. 11. Also shown are components for using this data to generate a viewing-history-based version of the similar items table 60, as described above section IV-B above.

As illustrated, the system includes an HTTP/XML application 37 that monitors clicks (page requests) of users, and records information about certain types of events within a click stream table 39. The click stream table is preferably stored in a cache memory 39 (volatile RAM) of a physical server computer, and can therefore be rapidly and efficiently accessed by the Session Recommendations application 52 and other real time personalization components. All accesses to the click stream table 39 are preferably made through the HTTP/XML application, as shown. The HTTP/XML application 37 may run on the same physical server machine(s) (not shown) as the Web server 32, or on a "service" layer of machines sitting behind the Web server machines. An important benefit of this architecture is that it is highly scalable, allowing the click stream histories of many thousands or millions of users to be maintained simultaneously.

In operation, each time a user views a product detail page, the Web server 32 notifies the HTTP/XML application 37, causing the HTTP/XML application to record the event in real time in a session-specific record of the click stream table. The HTTP/XML application may also be configured to record other click stream events. For example, when the user runs a search for a product, the HTTP/XML application may record the search query, and/or some or all of the items displayed on the resulting search results page (e.g., the top X products listed). Similarly, when the user views a browse node page (a page corresponding to a node of a browse tree in which the items are arranged by category), the HTTP/XML application may record an identifier of the page or a list of products displayed on that page.

A user access to a search results page or a browse node page may, but is preferably not, treated as a viewing event with respect to products displayed on such pages. As discussed in sections VIII and XI below, the session-specific histories of browse node accesses and searches may be used as independent or additional data sources for providing personalized recommendations.

In one embodiment, once the user has viewed a threshold number of product detail pages (e.g., 1, 2 or 3) during the current session, the user is presented with a link to a custom page of the type shown in FIG. 11. The link includes an appropriate message such as "view the page you made," and is preferably displayed persistently as the user navigates from page to page. When the user selects this link, a Session Recommendations component 52 accesses the user's cached session record to identify the products the user has viewed, and then uses some or all of these products as the "items of known interest" for generating the personal recommendations. These "Session Recommendations" are incorporated into the custom Web page (FIG. 11)—preferably along with other personalized content, as discussed below. The Session Recommendations may additionally or alternatively be displayed on other pages accessed by the user—either as explicit or implicit recommendations.

The process for generating the Session Recommendations is preferably the same as or similar to the process shown in FIG. 2, discussed above. The similar items table 60 used for this purpose may, but need not, reflect viewing-history-based similarities. During the filtering portion of the FIG. 2 process (block 90), any recently viewed items may be filtered out of the recommendations list.

As depicted by the dashed arrow in FIG. 8, after a browsing session is deemed to have ended, the session record (or a list of the products recorded therein) is moved to a query log database 42 so that it may subsequently be used to generate a viewing-history-based version of the similar items table 60. As part of this process, two or more sessions of the same user may optionally be merged to form a multi-session product viewing history. For example, all sessions conducted by a user within a particular time period (e.g., 3 days) may be merged. The product viewing histories used to generate the similar items table 60 may alternatively be generated independently of the click stream records, such as by extracting such data from a Web server access log. In one embodiment, the session records are stored anonymously (i.e., without any information linking the records to corresponding users), such that user privacy is maintained.

FIG. 9 illustrates the general form of the click stream table 39 maintained in cache memory according to one embodiment of the invention. Each record in the click stream table corresponds to a particular user and browsing session, and includes the following information about the session: a session ID, a list of IDs of product detail pages viewed, a list of page IDs of browse nodes viewed (i.e., nodes of a browse tree in which products are arranged by category), and a list of search queries submitted (and optionally the results of such search queries). The list of browse node pages and the list of search queries may alternatively be omitted. One such record is maintained for each "ongoing" session.

The browsing session ID can be any identifier that uniquely identifies a browsing session. In one embodiment, the browsing session ID includes a number representing the date and time at which a browsing session started. A "session" may be defined within the system based on times between consecutive page accesses, whether the user viewed another Web site, whether the user checked out, and/or other criteria reflecting whether the user discontinued browsing.

Each page ID uniquely identifies a Web page, and may be in the form of a URL or an internal identification. For a product detail page (a page that predominantly displays information about one particular product), the product's unique identifier may be used as the page identification. The detail page list may therefore be in the form of the IDs of the products whose detail pages were viewed during the session. Where voiceXML pages are used to permit browsing by telephone, a user access to a voiceXML version of a product detail page may be treated as a product "viewing" event.

The search query list includes the terms and/or phrases submitted by the user to a search engine of the Web site 30. The captured search terms/phrases may be used for a variety of purposes, such as filtering or ranking the personal recommendations returned by the FIG. 2 process, and/or identifying additional items or item categories to recommend.

FIG. 10 illustrates one embodiment of a page-item table that may optionally be used to translate page IDs into corresponding product IDs. The page-item table includes a page identification field and a product identification field. For purposes of illustration, product identification fields of sample records in FIG. 10 are represented by product names, although a more compact identification may be used. The first record of FIG. 10 represents a detail page (DP1) and its corresponding product. The second record of FIG. 10 represents a browse node page (BN1) and its corresponding list of products. A browse node page's corresponding list of products may include all of the products that are displayed on the browse node page, or a subset of these products (e.g., the top selling or most-frequently viewed products).

In one embodiment, the process of converting page IDs to corresponding product IDs is handled by the Web server 32, which passes a session ID/product_ID pair to the HTTP/XML application 37 in response to the click stream event. This conversion task may alternatively be handled by the HTTP/XML application 37 each time a click stream event is recorded, or may be performed by the Session Recommendations component 52 when personal recommendations are generated.

FIG. 11 illustrates the general form of a personalized "page I made" Web page according to a preferred embodiment. The page may be generated dynamically by the Session Recommendations component 52, or by a dynamic page generation component (not shown) that calls the Session Recommendations component. As illustrated, the page includes a list of recommended items 404, and a list of the recently viewed items 402 used as the "items of known interest" for generating the list of recommended items. The recently viewed items 402 in the illustrated embodiment are items for which the user has viewed corresponding product detail pages during the current session, as reflected within the user's current session record.

As illustrated, each item in this list 402 may include a hyperlink to the corresponding detail page, allowing the user to easily return to previously viewed detail pages.

As illustrated in FIG. 11, each recently-viewed item is displayed together with a check box to allow the user to individually deselect the item. De-selection of an item causes the Session Recommendations component 52 to effectively remove that item from the list of "items of known interest" for purposes of generating subsequent Session Recommendations. A user may deselect an item if, for example, the user is not actually interested in the item (e.g., the item was viewed by another person who shares the same computer). Once the user de-selects one or more of the recently viewed items, the user can select the "update page" button to view a refined list of Session Recommendations 404. When the user selects this button, the HTTP/XML application 37 deletes the de-selected item(s) from the corresponding session record in the click stream table 39, or marks such items as being deselected. The Session Recommendations process 52 then regenerates the Session Recommendations using the modified session record.

In another embodiment, the Web page of FIG. 11 includes an option for the user to rate each recently viewed item on a scale of 1 to 5. The resulting ratings are then used by the Session Recommendations component 52 to weight the correspond similar items lists, as depicted in block 84 of FIG. 2 and described above.

The "page I made" Web page may also include other types of personalized content. For instance, in the example shown in FIG. 11, the page also includes a list of top selling items 406 of a particular browse node. This browse node may be identified at page-rendering time by accessing the session record to identify a browse node accessed by the user. Similar lists may be displayed for other browse nodes recently accessed by the user. The list of top sellers 406 may alternatively be derived by identifying the top selling items within the product category or categories to which the recently viewed items 402 correspond. In addition, the session history of browse node visits may be used to generate personalized recommendations according to the method described in section VIII below.

In embodiments that support browsing by voice, the customized Web page may be in the form of a voiceXML page, or a page according to another voice interface standard, that is adapted to be accessed by voice. In such embodiments, the various lists of items 402, 404, 406 may be output to the customer using synthesized and/or pre-recorded voice.

An important aspect of the Session Recommendations service is that it provides personalized recommendations that are based on the activities performed by the user during the current session. As a result, the recommendations tend to strongly reflect the user's session-specific interests. Another benefit is that the recommendations may be generated and provided to users falling within one or both of the following categories: (a) users who have never made a purchase, rated an item, or placed an item in a shopping cart while browsing the site, and (b) users who are unknown to or unrecognized by the site (e.g., a new visitor to the site). Another benefit is that the user can efficiently refine the session data used to generate the recommendations.

The Session Recommendations may additionally or alternatively be displayed on other pages of the Web site 30. For example, the Session Recommendations could be displayed when the user returns to the home page, or when the user views the shopping cart. Further, the Session Recommendations may be presented as implicit recommendations, without any indication of how they were generated.

VI. Display of Recently Viewed Items

As described above with reference to FIG. 11, the customized Web page preferably includes a hypertextual list 402 of recently viewed items (and more specifically, products whose detail pages were visited in during the current session). This feature may be implemented independently of the Session Recommendation service as a mechanism to help users locate the products or other items they've recently viewed. For example, as the user browses the site, a persistent link may be displayed which reads "view a list of the products you've recently viewed." A list of the recently viewed items may additionally or alternatively be incorporated into some or all of the pages the user views.

In one embodiment, each hyperlink within the list 402 is to a product detail page visited during the current browsing session. This list is generated by reading the user's session record in the click stream table 39, as described above. In other embodiments, the list of recently viewed items may include detail pages viewed during prior sessions (e.g., all sessions over last three days), and may include links to recently accessed browse node pages and/or recently used search queries.

Further, a filtered version of a user's product viewing history may be displayed in certain circumstances. For example, when a user views a product detail page of an item in a particular product category, this detail page may be supplemented with a list of (or a link to a list of) other products recently viewed by the user that fall within the same product category. For instance, the detail page for an MP3 player may include a list of any other MP3 players, or of any other electronics products, the user has recently viewed.

An important benefit of this feature is that it allows users to more easily comparison shop.

VII. Display of Related Items on Product Detail Pages (FIGS. 12 and 13)

In addition to using the similar items table 60 to generate personal recommendations, the table 60 may be used to display "canned" lists of related items on product detail pages of the "popular" items (i.e., items for which a similar items list 64 exists). FIG. 12 illustrates this feature in example form. In this example, the detail page of a product is supplemented with the message "customers who viewed this item also viewed the following items," followed by a hypertextual list 500 of four related items. In this particular embodiment, the list is generated from the viewing-history-based version of the similar items table (generated as described in section IV-B).

An important benefit to using a similar items table 60 that reflects viewing-history-based similarities, as opposed to a table based purely on purchase histories, is that the number of product viewing events will typically far exceed the number of product purchase events. As a result, related items lists can be displayed for a wider selection of products—including products for which little or no sales data exists. In addition, for the reasons set forth above, the related items displayed are likely to include items that are substitutes for the displayed item.

Figure 12:
FIG. 12 illustrates the display of viewing-history-based related products lists on product detail pages.
Figure 13:
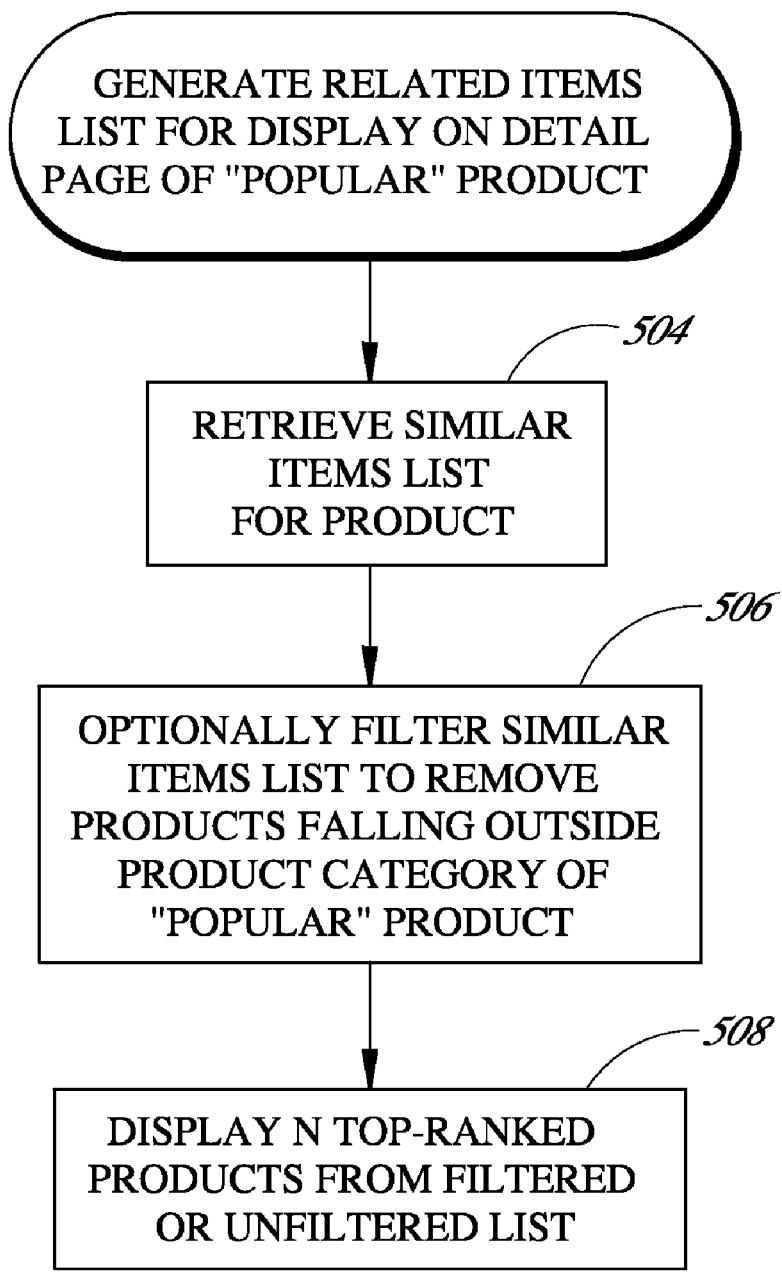
FIG. 13 illustrates a process for generating the related products lists of the type shown in FIG. 12.

FIG. 13 illustrates a process that may be used to generate a related items list 500 of the type shown in FIG. 12. As illustrated, the related items list 500 for a given product is generated by retrieving the corresponding similar items list 64 (preferably from a viewing-history-based similar items table 60 as described above), optionally filtering out items falling outside the product category of the product, and then extracting the N top-rank items. Once this related items list 64 has been generated for a particular product, it may be re-used (e.g., cached) until the relevant similar items table 60 is regenerated.

VIII. Recommendations Based on Browse Node Visits

As indicated above and shown in FIG. 9, a history of each user's visits to browse node pages (generally "browse nodes") may be stored in the user's session record. In one embodiment, this history of viewed browse nodes is used independently of the user's product viewing history to provide personalized recommendations.

For example, in one embodiment, the Session Recommendations process 52 identifies items that fall within one or more browse nodes viewed by the user during the current session, and recommends some or all of these items to the user (implicitly or explicitly) during the same session. If the user has viewed multiple browse nodes, greater weight may be given to an item that falls within more than one of these browse nodes, increasing the item's likelihood of selection. For example, if the user views the browse node pages of two music categories at the same level of the browse tree, a music title falling within both of these nodes/categories would be selected to recommend over a music title falling in only one.

As with the session recommendations based on recently viewed products, the session recommendations based on recently viewed browse nodes may be displayed on a customized page that allows the user to individually deselect the browse nodes and then update the page. The customized page may be the same page used to display the product viewing history based recommendations (FIG. 11).

A hybrid of this method and the product viewing history based method may also be used to generate personalized recommendations.

IX. Recommendations Based on Recent Searches

Each user's history of recent searches, as reflected within the session record, may be used to generate recommendations in an analogous manner to that described in section VIII. The results of each search (i.e., the list of matching items) may be retained in cache memory to facilitate this task.

In one embodiment, the Session Recommendations component 52 identifies items that fall within one or more results lists of searches conducted by the user during the current session, and recommends some or all of these items to the user (implicitly or explicitly) during the same session. If the user has conducted multiple searches, greater weight may be given to an item falling within more than one of these search results lists, increasing the item's likelihood of selection. For example, if the user conducts two searches, a music title falling within both sets of search results would be selected to recommend over a music title falling in only one.

As with the session recommendations based on recently viewed products, the session recommendations based on recently conducted searches may be displayed on a customized page that allows the user to individually deselect the search queries and then update the page. The customized page may be the same page used to display the product viewing history based recommendations (FIG. 11) and/or the browse node based recommendations (section VIII).

Any appropriate hybrid of this method, the product viewing history based method (section V-C), and the browse node based method (section VIII), may be used to generate personalized recommendations.

X. Recommendations within Physical Stores

The recommendation methods described above can also be used to provide personalized recommendations within physical stores. For example, each time a customer checks out at a grocery or other physical store, a list of the purchased items may be stored. These purchase lists may then be used to periodically generate a similar items table 60 using the process of FIG. 3A or 3B. Further, where a mechanism exists for associating each purchase list with the customer (e.g., using club cards), the purchase lists of like customers may be combined such that the similar items table 60 may be based on more comprehensive purchase histories.

Once a similar items table has been generated, a process of the type shown in FIG. 2 may be used to provide discount coupons or other types of item-specific promotions at check out time. For example, when a user checks out at a cash register, the items purchased may be used as the "items of known interest" in FIG. 2, and the resulting list of recommended items may be used to select from a database of coupons of the type commonly printed on the backs of grocery store receipts. The functions of storing purchase lists and generating personal recommendations may be embodied within software executed by commercially available cash register systems.

Although this invention has been described in terms of certain preferred embodiments, other embodiments that are apparent to those of ordinary skill in the art, including embodiments that do not provide all of the features and benefits set forth herein, are also within the scope of this invention. Accordingly, the scope of the present invention is intended to be defined only by reference to the appended claims.

In the claims which follow, any reference characters used to denote process steps are provided for convenience of description only, and not to imply a particular order for performing the steps.

What is claimed is:

1. A computer-implemented method of discovering behavior-based relationships between items represented in an electronic catalog, the method comprising:
   recording accesses by users to item detail pages of the electronic catalog, each item detail page corresponding to a respective catalog item, said accesses recorded without requiring the users to rate or purchase the items and without requiring the users to create lists of the items;
   storing a plurality of session records in computer storage, each session record being specific to a respective browsing session of a user and identifying a plurality of items for which the user accessed a corresponding item detail page during the browsing session, at least some of said session records corresponding to different users than other session records;
   generating data values representing strengths of relationships between particular ones of said items, wherein generating the data values comprises, for a pair of items consisting of a first item and a second item, determining, based on the plurality of session records, at least (1) the number of browsing sessions in which an item detail page for the first item was accessed, (2) the number of browsing sessions in which an item detail page for the second item was accessed, and (3) the number of browsing sessions in which item detail pages for both the first item and the second item were accessed; and
   generating a mapping of items to related items based at least partly on said data values;
   said method performed by a computing system that comprises one or more computers, wherein the method enables machine-based discovery of behavior-based item relationships without requiring the users to rate or purchase the items and without requiring the users to create lists of the items.

2. The method of claim 1, wherein generating the data values comprises generating, for said pair of items, a data value based on the equation $N_{common}/\sqrt{N_A \times N_B}$, where $N_{common}$ is the number of browsing sessions in which item detail pages for both the first item and the second item were accessed, sqrt is a square-root operation, $N_A$ is the number of browsing sessions in which an item detail page for the first item was accessed, and $N_B$ is the number of browsing sessions in which an item detail page for the second item was accessed.

3. The method of claim 1, further comprising using said mapping to supplement item detail pages of the electronic catalog with lists of related items.

4. The method of claim 1, further comprising causing an item detail page for a first item to be supplemented with a list of additional items and with an indication that the additional items are viewed by users who view the first item, said list based on said mapping.

5. The method of claim 1, further comprising using the mapping, in combination with a record of a plurality of items selected by a user during a current browsing session, to select items to recommend to the user during the current browsing session.

6. The method of claim 1, wherein generating the data values comprises using item purchase histories of users as an additional measure of item relatedness.

7. The method of claim 1, further comprising generating said session records based on monitored browsing activity of users such that each session record corresponds to a respective period of substantially continuous browsing activity.

8. The method of claim 1, further comprising generating said session records based on monitored browsing activity of users, wherein generating said session records comprises determining whether a particular browsing session has ended based at least partly on whether a checkout transaction has occurred.

9. The method of claim 1, wherein at least some of the session records are stored as anonymous session records that are not linked to corresponding users.

10. A computer-implemented method of discovering behavior-based relationships between items represented in an electronic catalog, the method comprising:
   storing a plurality of session records in computer storage, each session record being specific to a respective browsing session of a user and identifying the items selected by the user for viewing in the electronic catalog during the browsing session, at least some of said session records corresponding to different users than other session records;
   generating data values representing strengths of relationships between particular ones of said items, wherein generating the data values comprises, for a pair of items consisting of a first item and a second item, determining, based on the plurality of session records, the number of browsing sessions in which both items of the pair were selected for viewing and the number of browsing sessions in which the first item was selected for viewing; and
   generating a mapping of items to related items based at least partly on said data values;
   said method performed by a computing system that comprises one or more computers.

11. A system for discovering behavior-based relationships between items represented in an electronic catalog, the system comprising:
   a computer data repository that stores a plurality of session records, each session record being specific to a respective browsing session of a user and identifying items selected by the user for viewing in an electronic catalog during the browsing session, at least some of said session records corresponding to different users than other session records, said session records generated without requiring the users to rate or purchase the items and without requiring the users to create lists of the items; and a computing system programmed to at least:

generate data values representing strengths of relationships between particular ones of said items using a method that comprises, for an item pair consisting of a first item and a second item, determining, based on the plurality of session records, at least (1) the number of sessions in which the first item was selected for viewing, (2) the number of sessions in which the second item was selected for viewing, and (3) the number of sessions in which both items of the pair were selected for viewing; and generate a mapping of items to related items based at least partly on said data values;

whereby the system enables behavior-based relationships between items to be discovered without requiring the users to rate or purchase the items and without requiring the users to create lists of the items.

12. The system of claim 11, wherein the system, in generating the data values, is configured to treat each user access to an item detail page of the electronic catalog as a selection of a corresponding item for viewing.

13. The system of claim 12, further comprising a component that is configured to use said mapping to supplement item detail pages of the electronic catalog with corresponding lists of related items.

14. The system of claim 11, further comprising a component that is configured to supplement an item detail page for the first item with a list of additional items, and with an indication that the additional items are viewed by users who view the first item, said list based on the mapping.

15. The system of claim 11, further comprising a recommendation system configured to use the mapping, in combination with a record of a plurality of items selected by a user for viewing during a current browsing session, to select items to recommend to the user during the current browsing session.

16. The system of claim 11, further comprising a component that is configured to generate said session records based on monitored browsing activity of users such that each session record corresponds to a respective period of substantially continuous browsing activity.

17. The system of claim 11, further comprising a component that is configured to generate the session records based on monitored browsing activity of users, said component configured to determine whether a particular browsing session has ended based at least partly on whether a checkout transaction has occurred.

18. The system of claim 11, wherein at least some of the session records are stored in said data repository as anonymous session records.

19. A system for discovering behavior-based relationships between items represented in an electronic catalog, the system comprising:

a computer data repository that stores a plurality of session records, each session record being specific to a respective browsing session of a user and identifying the items selected by the user for viewing in the electronic catalog during the browsing session, at least some of said session records corresponding to different users than other session records; and a computing system programmed to at least:

generate data values representing strengths of relationships between particular ones of said items using a method that comprises determining, for a pair of items consisting of a first item and a second item, based on the plurality of session records, the number of sessions in which both items of the pair were selected for viewing and the number of sessions in which the first item of the pair was selected for viewing; and generate a mapping of items to related items based at least partly on said data values.

20. The system of claim 19, wherein each session record identifies a plurality of items selected by the respective user for viewing in the electronic catalog during the browsing session.

21. A system for discovering and exposing behavior-based relationships between items represented in an electronic catalog, the system comprising:

a monitoring system that is configured to generate records of item viewing activities of a plurality of users, said records of item viewing activities identifying particular items selected by users for viewing in an electronic catalog of items, said monitoring system configured to generate said records without requiring the users to rate or purchase the items and without requiring the users to create lists of the items;

a first component that is configured to generate a mapping of items to related items based on the records of item viewing activities, said mapping reflecting item-viewing-based relationships between items, said first component comprising computer hardware, said first component configured to measure relationships between items by a process that comprises, for an item pair consisting of a first item and a second item, determining at least (1) the number of sessions in which the first item was selected for viewing, (2) the number of sessions in which the second item was selected for viewing, and (3) the number of sessions in which both the first item and the second item were selected for viewing; and a second component that is configured to use the mapping to incorporate lists of related items into item detail pages of the electronic catalog;

said system enabling behavior-based item relationships to be discovered without requiring the users to rate or purchase the items and without requiring the users to create lists of the items.

22. The system of claim 21, wherein the second component is configured to supplement an item detail page for the first item with a list of additional items, and with an indication that the additional items are viewed by users who view the first item, said list based on said mapping.

23. The system of claim 21, wherein the first component is configured to generate, for the item pair, a data value based on the equation $N_{common}/\sqrt{N_A \times N_B}$, where $N_{common}$ is the number of sessions in which both the first item and the second item were selected for viewing, sqrt is a square-root operation, $N_A$ is the number of sessions in which the first item was selected for viewing, and $N_B$ is the number of sessions in which the second item was selected for viewing.

24. The system of claim 21, wherein the items are products capable of being purchased via the electronic catalog.

25. The system of claim 21, wherein the records of item viewing activities are based on visits to item detail pages of the electronic catalog.

* * * * *